(12) United States Patent
Okamoto et al.

(10) Patent No.: US 7,082,612 B2
(45) Date of Patent: Jul. 25, 2006

(54) TRANSMISSION APPARATUS OF VIDEO INFORMATION, TRANSMISSION SYSTEM OF VIDEO INFORMATION AND TRANSMISSION METHOD OF VIDEO INFORMATION

(75) Inventors: Kazuo Okamoto, Hirakata (JP); Takashi Masuno, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1099 days.

(21) Appl. No.: 09/844,565

(22) Filed: Apr. 27, 2001

(65) Prior Publication Data

US 2002/0159517 A1 Oct. 31, 2002

(30) Foreign Application Priority Data

Apr. 25, 2001 (JP) .............................. 2001-128286

(51) Int. Cl.
*G06F 3/00* (2006.01)
(52) U.S. Cl. ........................................................ 725/39
(58) Field of Classification Search ........... 375/240.01, 375/240.15, 240.13, 240.16, 240.18, 240.26; 725/39; H04N 7/36, 7/12; H04B 1/66; G06F 3/00
See application file for complete search history.

(56) References Cited

U.S. PATENT DOCUMENTS 5,448,656 A * 9/1995 Tanaka ...................... 382/252
6,333,948 B1 * 12/2001 Kurobe et al. ......... 375/240.13
6,389,073 B1 * 5/2002 Kurobe et al. ......... 375/240.03

* cited by examiner

*Primary Examiner*—Tung Vo
(74) *Attorney, Agent, or Firm*—Akin Gump Strauss Hauer & Feld, LLP

(57) ABSTRACT

A transmission apparatus for video information is disclosed. The apparatus has an input part for inputting video; a level information generation part for generating level information of each pixel on a screen; a memory part for storing the level information of each pixel in the entire region of the screen; a region extraction part for extracting a changed region which is a region on the screen including pixels related to the video information; an update region level information generation part for generating level information of each pixel in the changed region; a compression part for compressing the information amount of level information of each pixel in the changed region; and a communication part for transmitting position information of the changed region and the compressed level information.

24 Claims, 15 Drawing Sheets

FIG. 10
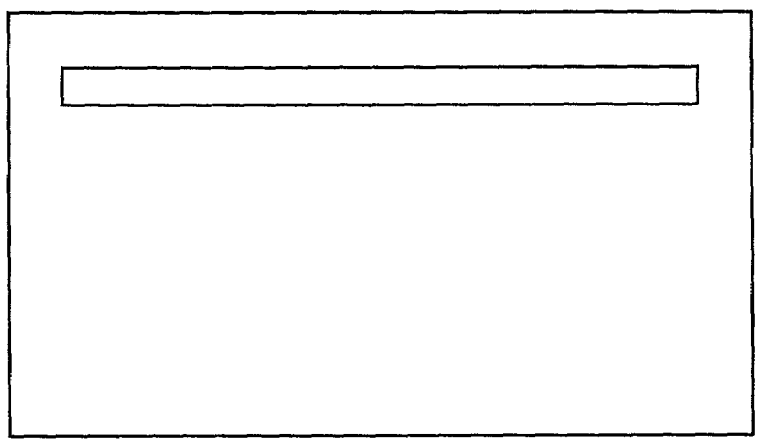
(a)
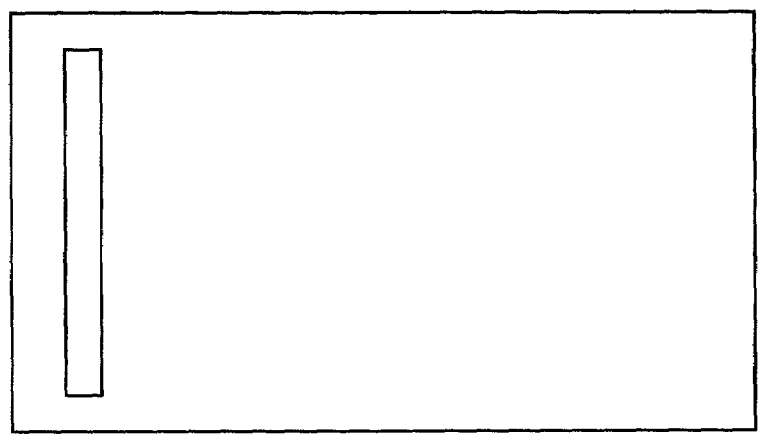
(b)
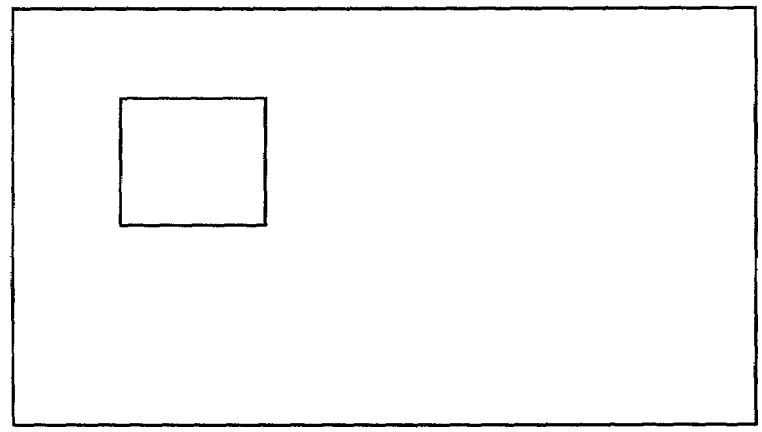
(c)

F I G. 1 1
(a)
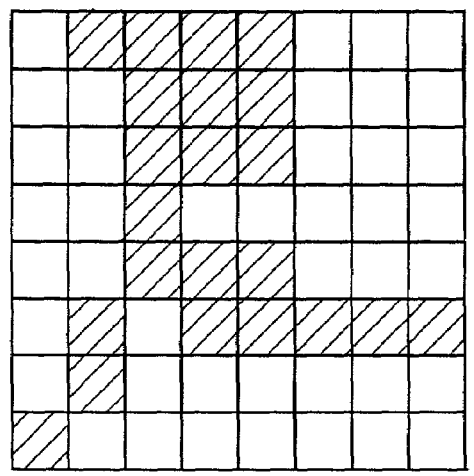
(b)
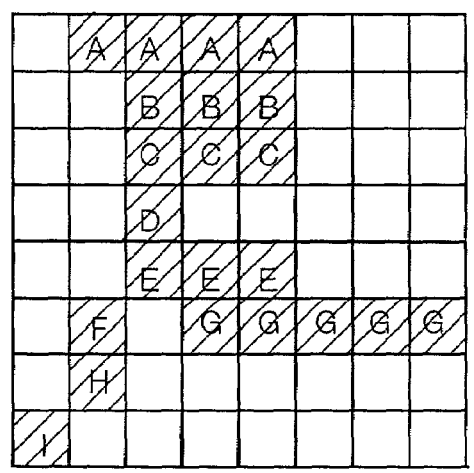
(c)
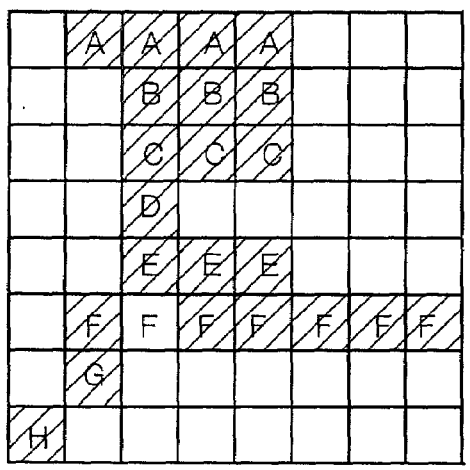

FIG. 12
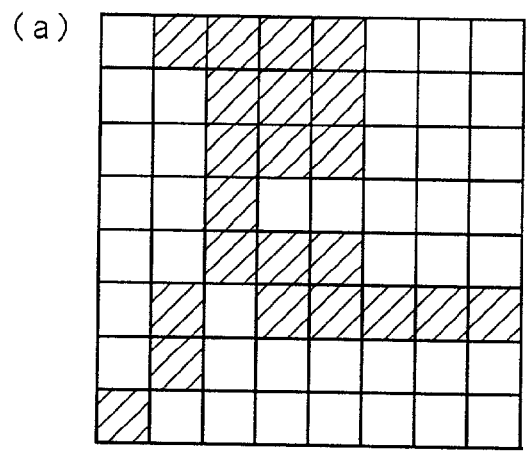
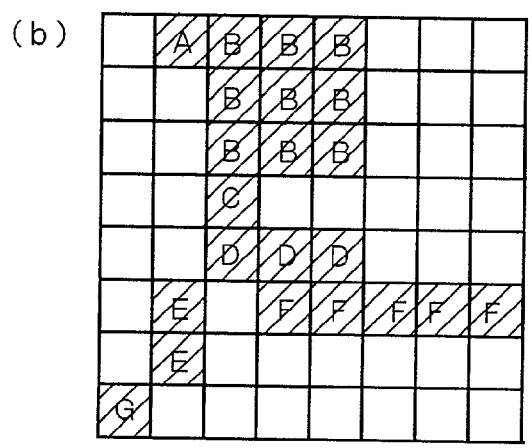
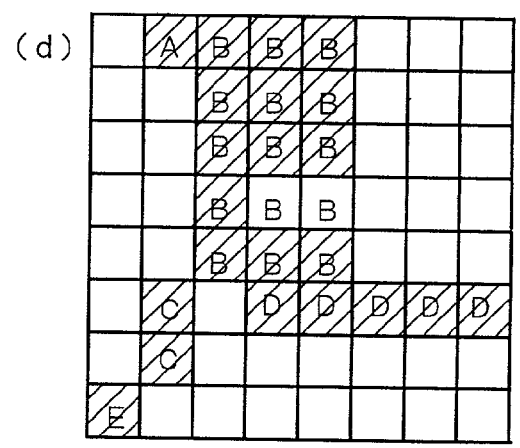
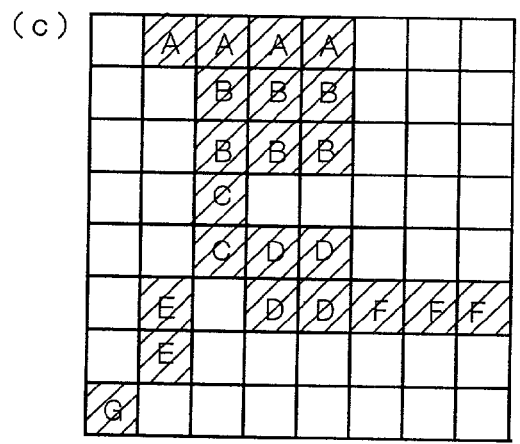
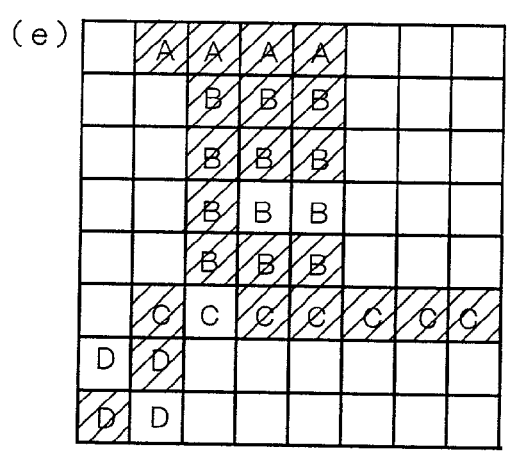

F I G. 1 4 row address

|   | 0 | 1 | 2 | 3 | 4 | 5 | 6 | 7 |
|---|---|---|---|---|---|---|---|---|
| 0 |   | (4,1) | (3,5) | (2,3) | (1,3) |   |   |   |
| 1 |   |   | (3,4) | (2,2) | (1,2) |   |   |   |
| 2 |   |   | (3,3) | (2,1) | (1,1) |   |   |   |
| 3 |   |   | (1,2) |   |   |   |   |   |
| 4 |   |   | (3,1) | (2,2) | (1,2) |   |   |   |
| 5 |   | (1,2) |   | (5,1) | (4,1) | (3,1) | (2,1) | (1,1) |
| 6 |   | (1,1) |   |   |   |   |   |   |
| 7 | (1,1) |   |   |   |   |   |   |   | column address

US 7,082,612 B2

TRANSMISSION APPARATUS OF VIDEO INFORMATION, TRANSMISSION SYSTEM OF VIDEO INFORMATION AND TRANSMISSION METHOD OF VIDEO INFORMATION

BACKGROUND OF THE INVENTION

The present invention relates to a transmission apparatus of video information, a transmission system of video information and a transmission method of video information.

In recent years the application field of computers has widened. In it a computer wherein a part (referred to as "first terminal apparatus") including a CPU (central processing unit) or the like, and a part (referred to as "second terminal apparatus") including a display part for video (or display part and input part) are separated is in demand by the market.

FIG. 3 is a conceptual diagram of a computer which has a first terminal apparatus and a second terminal apparatus.

In FIG. 3, the first terminal apparatus which includes a CPU is denoted as 301, the second terminal apparatus which includes a display part and a pen input part is denoted as 302, a conventional PC (abbreviation of personal computer which has a CPU and a display part) is denoted as 303, a docking station is denoted as 304, a keyboard is denoted as 305 and a display part is denoted as 306. The first terminal apparatus 301 has a CPU 311 and a wireless communication part 312. The second terminal apparatus 302 has a display and pen input part 321 and a wireless communication part 323. The user can input instructions to the computer by touching a pen 322 to the display and pen input part 321.

Video information generated in the CPU 311 of the first terminal apparatus 301 is transmitted from the wireless communication part 312. The wireless communication part 323 of the second terminal apparatus 302 receives the video information and transmits it to the display and pen input part 321. The display and pen input part 321 displays the inputted video information.

When the user inputs instruction for the computer to the display and pen input part 321 of the second terminal apparatus with the pen 322, this instruction information is transmitted from the wireless communication part 323. The wireless communication part 312 of the first terminal apparatus 301 inputs this instruction information, and transmits it to the CPU 311. The CPU 311 inputs instruction information and processes information in accordance with the instruction information.

Generally the user only utilizes the first terminal apparatus 301 and the second terminal apparatus 302. The user can move freely by carrying around the second terminal apparatus 302 which is light and which does not have a connection cord.

The user connects the docking station 304 to the first terminal apparatus 301 and connects the keyboard 305 and the display part 306 to the docking station 304 and, thereby, can construct and utilize a computer system comprising the first terminal apparatus 301, the docking station 304, the keyboard 305 and the display part 306.

An optional wireless communication part 331 can be incorporated into the conventional PC 303. The video information generated by the CPU of the PC 303 is transmitted from the wireless communication part 331. The wireless communication part 323 of the second terminal apparatus 302 receives the video information and transmits it to the display and pen input part 321. The display and pen input part 321 displays the inputted video information.

When the user inputs instruction for the computer to the display and pen input part 321 of the second terminal apparatus with the pen 322, this instruction information is transmitted from the wireless communication part 323. The wireless communication part 331, which is incorporated into the conventional PC 303, inputs this instruction information and transmits it to the CPU. The CPU of the conventional PC 303 inputs the instruction information and processes information in accordance with the instruction information.

In this manner, the user can utilize a conventional PC as the first terminal apparatus 301.

FIG. 15 is a block diagram, (mainly showing a transmission apparatus for video information and a transmission system for video information included in the computer) of a conventional computer which has a first terminal apparatus and a second terminal apparatus. The conventional computer of FIG. 15 includes an video information transmission apparatus which transmits video information from the first terminal apparatus to the second terminal apparatus.

In FIG. 15, the first terminal apparatus is denoted as 1501, the second terminal apparatus is denoted as 1502, a display (display part) is denoted as 1503 and a wire connecting the first terminal apparatus 1501 with the second terminal apparatus 1502 is denoted as 1504.

The first terminal apparatus 1501 has a CPU 1511, a video graphics control part 1513, an LCD driving part 1515 (liquid crystal display driving part), a liquid crystal display 1516 and a communication board 1514. Though indispensable for a computer, a ROM, a RAM and the like, which do not relate directly to the present invention, are omitted in the description.

The CPU 1511, the video graphics control part 1513 and the communication board 1514 are connected to each other via a PCI bus 1512.

The video graphics control part 1513 has a CPU 1521, an input/output part 1522, a RAM 1523, a VRAM 1524, a write in/read out address register 1525, a read out address register 1526, a clock generator 1527 and a parallel/serial conversion part 1528.

The CPU 1521, the input/output part 1522, the RAM 1523, the VRAM 1524, the write in/read out address register 1525 and the like are connected to each other via an internal bus 1529.

The CPU 1511 transmits video change instructions which are described in a software language (such as DirectX (registered trademark of Microsoft Corporation)) to the video graphics control part 1513 and the communication board 1514 via the PCI bus 1512.

The input/output part 1522 of the video graphics control part 1513 transmits the inputted video change instructions which are described in a software language to the CPU 1521 via the internal bus 1529.

The CPU 1521 converts the video change instructions which are described in a software language (program arranged on the Application Programming Interface of the OS of this computer) into the level information (for example, information concerning the value to which the value of any address of the VRAM is changed) of each pixel at the hardware level by utilizing an video information decoder 1541. The RAM 1523 is a scratch region at the time when the level information of each pixel is generated, by utilizing the video information decoder 1541. The VRAM 1524 is a dual port RAM for video display which has a port that can randomly access an arbitrary address so as to carry out write in and read out (address is designated by a write in/read out address register 1525) and a port that can read out data of each address at high speed and in a constant order (address is designated by a read out address register 1526). The level information (level information of each of the sub-pixels, RGB), attribute data and the like are stored in the VRAM 1524.

The CPU 1521 and the like set an address in the write in/read out address register 1525. Information is written into this address through the internal bus 1529 and information is read out from this address through the internal bus 1529.

The clock generator 1527 sets a read out address register 1526. The set value of the address register 1526 is generally incremented at an extremely high rate. The information of the address designated by the address register 1526 is read out and is forwarded to the parallel/serial conversion part 1528. The parallel/serial conversion part 1528 converts the inputted information of each address (level information of each pixel) into serial data, which are then outputted.

An output signal from the parallel/serial conversion part 1528 is transmitted to an LCD driving part 1515 and is converted to a signal for driving an LCD (liquid crystal display). The LCD driving part 1515 drives the liquid crystal display 1516. The liquid crystal display 1516 displays video.

In addition, the output signal from the parallel/serial conversion part 1528 is transmitted to the external display 1503. The display 1503 displays video.

The communication board 1514 receives the video change instructions which are described in a software language and which are transmitted through the PCI bus 1512 (outputted by the CPU 1511). The communication board 1514 transmits the video change instructions which are described in a software language to the second terminal apparatus 1502 through the connecting wire 1504.

The communication board 1531 of the second terminal apparatus 1502 transmits the received video change instructions which are described in a software language to the video graphics control part 1532. The video graphics control parts 1532 and 1513 have the same configuration. The video graphics control part 1532 generates and outputs the display data of each pixel based on the video change instructions which are described in a software language. The display 1533 displays video by driving each pixel in accordance with the display data.

In a conventional computer which has a first terminal apparatus and a second terminal apparatus, however, information flow between the first terminal apparatus and the second terminal apparatus is carried out with video change instructions which are described in a software language. Therefore, data cannot be transmitted or received between the first terminal apparatus and the second terminal apparatus in which different OSs are installed. In particular, the user who has a plurality of first terminal apparatus in which plural and different OSs are installed must utilize, through precise differentiation, a first terminal apparatus and a second terminal apparatus in which a first OS is installed as well as a first terminal apparatus and a second terminal apparatus in which a second OS is installed, and, in this regard, mistakes may easily occur. For example, the case wherein the user brings the first terminal apparatus in which the first OS is installed and the second terminal apparatus in which the second OS is installed on a distant trip, results in the apparatus being unusable. Therefore, a data transmission system between a first terminal apparatus and a second terminal apparatus that does not depend on an OS is requested by users who have a plurality of first terminal apparatus in which plural and different OSs are installed.

There is also the idea of transmitting the output signal from the parallel/serial conversion part 1528 to the second terminal apparatus 1502 without change. However, in the case that a full color display with RGB consisting, respectively, of 8 bits is implemented on a UXGA screen (1600× 1200 pixels), the output signal of the parallel/serial conversion part exceeds 46 Mbps. It is extremely difficult to transmit data at such a high rate in a wireless manner.

The present invention has the purpose of providing a transmission apparatus for video information, a transmission system for video information and a transmission method for video information which enable wireless transmission of video information at a low rate regardless of OS.

SUMMARY OF THE INVENTION

The present invention solves the above-described problem by means of the below-described configurations.

The present invention according to claim 1 provides a transmission apparatus for video information characterized by having:

an input part for inputting video information transmitted by a central processing unit;

a level information generation part for generating level information of each pixel on a screen based on at least said video information;

a memory part for storing level information of each pixel in the entire region of the screen;

a region extraction part for extracting a region on the screen including pixels related to said video information;

an update region level information generation part for generating level information of each pixel in said region of the screen based on, at least, either the level information of each pixel generated by said level information generation part or the level information of each pixel stored in said memory part;

a compression part for compressing the information amount of level information of each pixel in said region of the screen; and a communication part for transmitting position information of said region of the screen and said compressed level information.

The present invention according to claim 2 provides a transmission apparatus for video information characterized by having:

an input part for inputting video information transmitted by a central processing unit;

a level information generation part for generating level information of each pixel on a screen based on at least said video information;

a memory part for storing level information of each pixel in the entire region of the screen;

a region extraction part for extracting a region on the screen including pixels related to said video information;

an update region level information generation part for generating differential information of the level information of each pixel in said extracted region of the screen based on, at least, the level information of each pixel generated by said level information generation part and the level information of each pixel stored in said memory part;

a compression part for compressing the information amount of the differential information of the level information of each pixel in said extracted region of the screen; and a communication part for transmitting position information of said region of the screen and said compressed differential information.

The present invention according to claim 3 provides a transmission apparatus for video information according to claim 1 or 2, characterized in that said extracted region of the screen is a region in a rectangular form including pixels of m rows and n columns (m, n are positive integers of 1 or more, respectively).

The present invention according to claim 4 provides a transmission apparatus for video information according to claim 3, characterized in that said extracted region of the screen is a set of pixels wherein the upper i bits of the row address (in the case that the row address is assumed to be data of h bits, i is a positive integer satisfying $1 \leq i \leq (h-1)$) and the upper j bits of the column address (in the case that the column address is assumed to be data of k bits, j is a positive integer satisfying $1 \leq j \leq (k-1)$) of each pixel on the screen are the same.

The present invention according to claim 5 provides a transmission apparatus for video information according to claim 1 or 2, characterized in that said communication part is a wireless communication part.

The present invention according to claim 6 provides a transmission apparatus for video information according to claim 1 or 2, characterized, in addition, in that:

said memory part outputs level information of each pixel in the entire region of the screen to said update region level information generation part at least once or more for every constant period of time;

said compression part compresses the information amount of the level information of each pixel in said entire region of the screen; and said communication part transmits identification information for identifying said compressed level information of the entire region of the screen from said compressed level information of the region of the screen or from said compressed differential information as well as said compressed level information of the entire region of the screen.

The present invention according to claim 7 provides a transmission system for video information characterized by having:

a first terminal apparatus including a central processing unit and a transmission apparatus for video information according to claim 1; and a second terminal apparatus, wherein said second terminal apparatus has:

a communication part for receiving position information of said region of the screen and said compressed level information;

an expansion part for expanding said compressed level information and outputs level information of each pixel in the extracted region of the screen;

a memory part which stores the level information of each pixel in the entire region of the screen and which stores the level information of each pixel outputted by said expansion part in accordance with the position information of said region of the screen; and a display part for displaying a screen in accordance with the level information of each pixel stored in said memory part.

The present invention according to claim 8 provides a transmission system for video information characterized by having:

a first terminal apparatus including a central processing unit and a transmission apparatus for video information according to claim 2; and a second terminal apparatus, wherein said second terminal apparatus has:

a communication part for receiving position information of said region of the screen and said compressed differential information;

an expansion part for expanding said compressed differential information and generates differential information of each pixel in the extracted region of the screen;

a memory part which stores the level information of each pixel in the entire region of the screen and which stores the level information of each pixel generated by the level information generation part in accordance with the position information of said region of the screen;

said level information generation part for generating level information of each pixel based on the differential information of each pixel generated by said expansion part and the level information of each pixel stored in said memory part; and a display part for displaying a screen in accordance with the level information of each pixel stored in said memory part.

The present invention according to claim 9 provides a transmission system for video information according to claim 7 or 8, characterize in that said communication parts of said first terminal apparatus and said second terminal apparatus are wireless communication parts, respectively.

The present invention according to claim 10 provides a transmission method for video information, characterized by having:

the input step of inputting video information transmitted by a central processing unit;

the level information generation step of generating level information of each pixel on a screen based on, at least, said video information;

the memory step of storing said level information of each pixel in a memory part;

the region extraction step of extracting a region of the screen which includes pixels related to said video information;

the update region level information generation step of generating level information of each pixel in said region of the screen based on, at least, either the level information of each pixel generated in said level information generation step or the level information of each pixel stored in said memory part;

the compression step of compressing the information amount of the level information of each pixel in said region of the screen; and the transmission step of transmitting position information of said region of the screen and said compressed level information.

The present invention according to claim 11 provides a transmission method for video information, characterized by having:

the input step of inputting video information transmitted by a central processing unit;

the level information generation step of generating level information of each pixel on a screen based on, at least, said video information;

the region extraction step of extracting a region of the screen which includes pixels related to said video information;

the update region level information generation step of generating differential information of level information of each pixel in said extracted region of the screen based on, at least, the level information of each pixel generated in said level information generation step and the level information of each pixel stored in a memory part;

the memory step of storing said level information of each pixel in said memory part;

the compression step of compressing the information amount of the differential information of the level information of each pixel in said extracted region of the screen; and the transmission step of transmitting position information of said region of the screen and said compressed differential information.

The present invention according to claim 12 provides a transmission method for video information according to claim 10 or 11, characterized in that said extracted region of the screen is a rectangular region including pixels of m rows and n columns (m, n are positive integers of 1 or more, respectively).

The present invention according to claim 13 provides a transmission method for video information according to claim 12, characterized in that said extracted region of the screen is a set of pixels wherein the upper i bits of the row address (in the case that the row address is assumed to be data of h bits, i is a positive integer satisfying $1 \leq i \leq (h-1)$) and the upper j bits of the column address (in the case that the column address is assumed to be data of k bits, j is a positive integer satisfying $1 \leq j \leq (k-1)$) of each pixel on the screen are the same.

The present invention according to claim 14 provides a transmission method for video information according to claim 10 or 11, characterized in that information are transmitted by means of a wireless communication in said transmission step.

The present invention according to claim 15 provides a transmission method for video information according to claim 10 or 11, characterized by further having:

the entire region level information generation step of reading out level information of each pixel in the entire region of the screen from said memory part with a frequency of at least once or more for a constant period of time;

the entire region level information compression step of compressing the information amount of the level information of each pixel in the entire region of the screen; and the entire region level information transmission step of transmitting identification information for identifying said compressed level information of the entire region of the screen from said compressed level information of the region of the screen or from said compressed differential information and said compressed level information of the entire region of the screen.

The present invention according to claim 16 provides a transmission method for video information characterized by having:

each step of the transmission method for video information according to claim 10;

the communication step of receiving said position information of the region of the screen and said compressed level information of the region of the screen;

the expansion step of expanding said compressed level information of the region of the screen and of outputting level information of each pixel of the region of the screen;

the memory step of storing the level information of each pixel outputted in said expansion step in a memory part in accordance with said position information of the region of the screen; and the display step of displaying a screen in accordance with the level information of each pixel stored in said memory part.

The present invention according to claim 17 provides a transmission method for video information characterized by having:

each step of the transmission method for video information according to claim 11;

the reception step of receiving said position information of the region of the screen and said compressed differential information;

the expansion step of expanding said compressed differential information and of generating differential information of level information of each pixel of the extracted region of the screen;

the level information generation step of generating level information of each pixel based on the differential information of the level information of each pixel generated in said expansion step and the level information of each pixel stored in the memory part the memory step of storing the level information of each pixel generated in said level information generation step in said memory part in accordance with said position information of the region of the screen; and the display step of displaying a screen in accordance with the level information of each pixel stored in said memory part.

The present invention according to claim 18 provides a transmission method for video information according to claim 16 or 17, characterized in that said transmission step and said reception step are implemented by means of a wireless communication.

According to the present invention, all the video information is not transmitted but, rather, only the information of the changed part is transmitted. In addition, by utilizing the differential information of the data (difference between previous data and current data), information amount to be transmitted can be further reduced.

The present invention has the effect that a transmission apparatus for video information, a transmission system for video information and a transmission method for video information which allow the transmission of video information (in particular, the transmission by means of a wireless communication) at a low bit rate regardless of OS can be implemented.

The novel features of the invention will be hereinafter fully described and particularly pointed out in the appended claims, and the construction and details of the invention, together with other objects and features thereof, will become better understood and appreciated by reference to the following detailed description when considered in conjunction with the accompanying drawings.

BRIEF DESCRIPTION OF THE DRAWINGS

FIG. 10 is a diagram for describing a compression pattern control signal;

FIG. 11 is a diagram showing groups of changed regions formed in the case that a method for grouping regions continuing only in the lateral direction is used;

FIG. 12 is a diagram showing a variety of groups of changed regions formed in the case that a method for grouping regions continuing in the longitudinal direction and the lateral direction is used;

FIG. 14 is a diagram showing two dimensional data written in the write in upper address memory part in the case that a method for grouping regions continuing in the longitudinal direction and in the lateral direction is used.

It will be appreciated that all or part of the drawings are purely diagrammatic for illustrative purposes and do not necessarily present faithful depictions of the actual relative sizes and positions of the illustrated elements.

DETAILED DESCRIPTION OF THE INVENTION

In the following, embodiments which concretely show the best mode for carrying out the present invention are described in conjunction with the drawings.

EMBODIMENT 1

In reference to FIGS. 1 to 5, a transmission apparatus for video information, a transmission system for video information and a transmission method for video information are described according to Embodiment 1.

Figure 3:
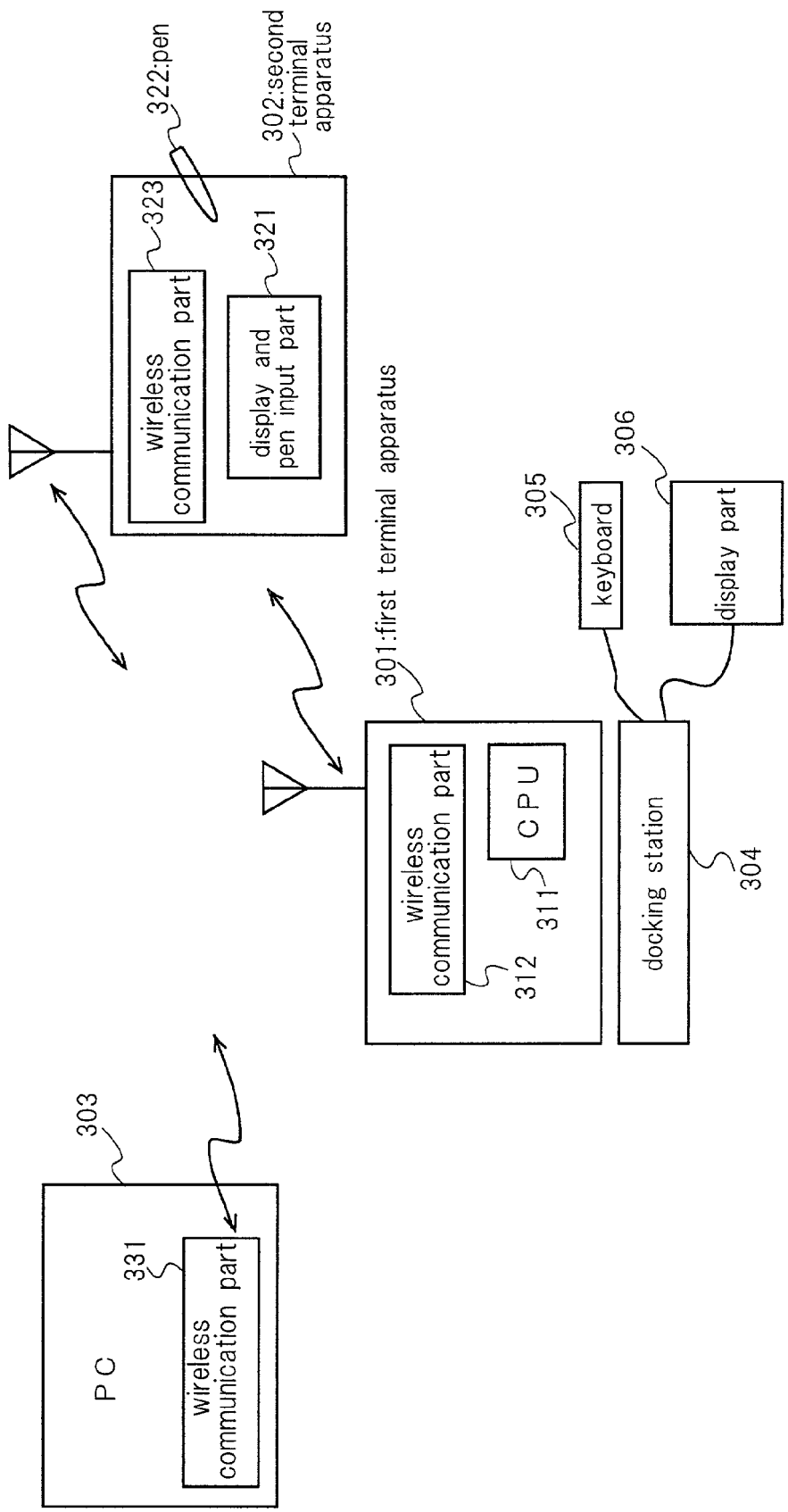
FIG. 3 is a conceptual diagram of a computer which has a first terminal apparatus and a second terminal apparatus.

FIG. 3 is a conceptual diagram of a computer which has a first terminal apparatus and a second terminal apparatus. FIG. 3 is already described in the prior art. FIG. 3 shows an example of a conceptual diagram of a computer which has a first terminal apparatus and a second terminal apparatus in order to facilitate the understanding of the present invention while the objectives of applications of the present invention are not limited to a computer which has the configuration of FIG. 3.

<Description of the Configurations of the Transmission Apparatus for Video Information and the Transmission System for Video Information>

Figure 1:
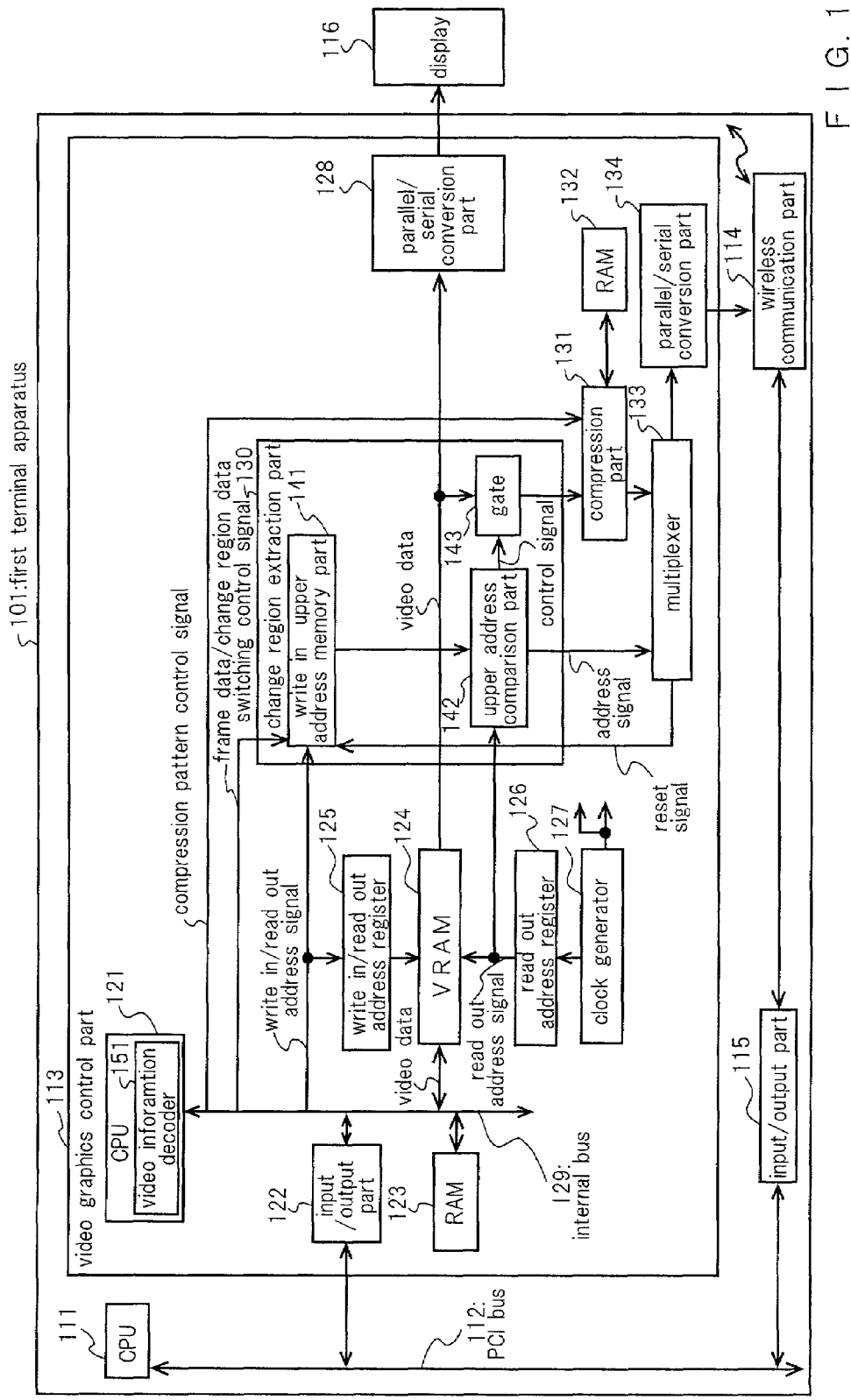
FIG. 1 is a block diagram of a first terminal apparatus in a computer according to Embodiment 1.
Figure 2:
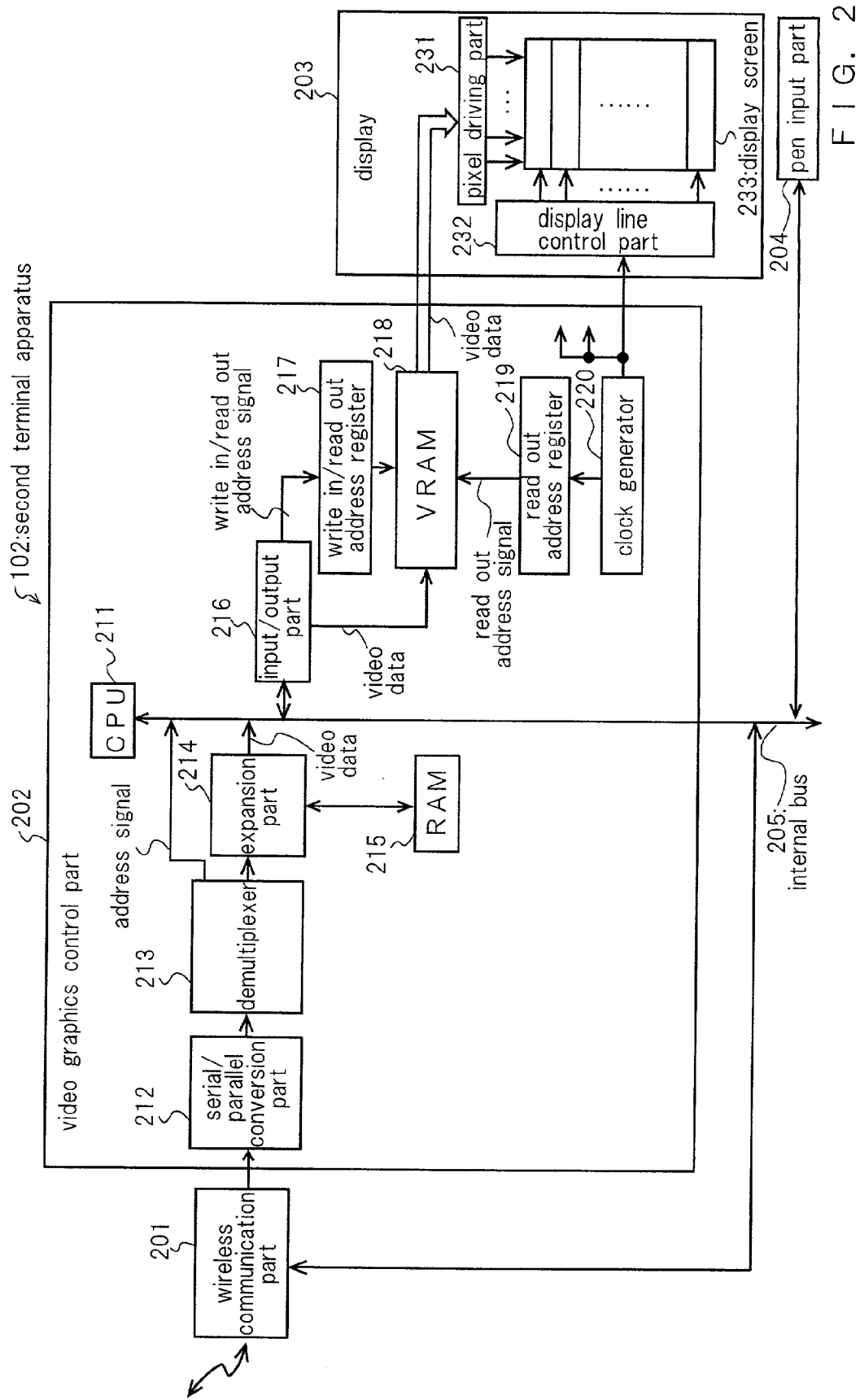
FIG. 2 is a block diagram of a second terminal apparatus in a computer according to Embodiment 1.

In reference to FIGS. 1 and 2, the configurations of a transmission apparatus for video information and transmission system for video information included in a computer according to Embodiment 1 of the present invention which has a first terminal apparatus and a second terminal apparatus are described.

FIG. 1 is a block diagram (mainly showing a transmission apparatus for video information and a transmission system for video information included in the computer) of a first terminal apparatus 101 in a computer according to Embodiment 1 of the present invention which has a first terminal apparatus and a second terminal apparatus.

In FIG. 1, the first terminal apparatus 101 has a CPU 111, a video graphics control part 113, a wireless communication part 114 and an input/output part 115. An external display 116 can be connected to the first terminal apparatus 101.

In FIG. 1, though indispensable for a computer, a ROM, a RAM and the like which do not directly relate to the present invention are omitted in description.

The CPU 111, the video graphics control part 113 and the input/output part 115 are connected to each other via a PCI bus 112.

The video graphics control part 113 has a CPU 121, an input/output part 122, a RAM 123, a VRAM 124, a write in/read out address register 125, a read out address register 126, a clock generator 127, a parallel/serial conversion part 128, a change region extraction part 130, a compression part 131, a RAM 132, a multiplexer 133 and a parallel/serial conversion part 134.

The CPU 121, the input/output part 122, the RAM 123, the VRAM 124, the write in/read out address register 125, the change region extraction part 130, the compression part 131 and the like are connected to each other via an internal bus 129.

The change region extraction part 130 has a write in upper address memory part 141, an upper address comparison part 142 and a gate 143.

The CPU 111 transmits change instructions of video described in a software language (for example, DirectX) to the video graphics control part 113 through the PCI bus 112.

The input/output part 122 of the video graphics control part 113 transmits the inputted change instructions of video described in a software language to the CPU 121 via the internal bus 129.

The CPU 121 converts the change instructions of video described in a software language (program arranged on the Application Programming Interface of the OS of this computer) to level information of each pixel at a hardware level (for example, information indicating a change of data of any address in the VRAM into a certain value) by utilizing an video information decoder 151. The RAM 123 is a scratch region at the time of generating level information (referred to as "video data") of each pixel by utilizing the video information decoder 151.

The VRAM 124 is a dual port RAM for video display which has a port that can randomly access an arbitrary address so as to carry out write in or read out (address is designated by the write in/read out address register 125) and a port that can read out data of each address at a high rate and in a constant order (address is designated by the read out address register 126). The level information of each pixel (level information of each of sub-pixels of RGB), attribute data and the like are stored in the VRAM 124.

The RAM 123 forms, in many cases, a part of the VRAM 124 in the video graphics control part. In this case the VRAM has a display area and a non-display area, wherein the display area corresponds to the VRAM 124 of FIG. 1 while the non-display area corresponds to the RAM 123 of FIG. 1.

The CPU 121 or the like sets an address in the write in/read out address register 125. Video data (level information of each pixel) are written into this address through the internal bus 129 and video data are read out from this address through the internal bus 129.

The write in upper address memory part 141 of the change region extraction part 130 stores the upper bits of the write in address set in the write in/read out address resistor 125. In the case that the write in address is assumed to be formed of row address data of h bits and column address data of k bits (h, k are arbitrary positive integers of 2 or more), the write in upper address memory part 141 stores the upper i bits (i is an arbitrary integer satisfying $1 \leq i \leq h-1$) of the row address data and the upper j bits (j is an arbitrary integer satisfying $1 \leq j \leq k-1$) of the column address data.

Thereby, the upper address of the address of the VRAM 124 (display area of a VRAM in the case that the VRAM includes the RAM 123 and the VRAM 124) to which new data have been written in is stored.

The clock generator 127 sets the read out address register 126. The set value of the address register 126 is generally incremented at an extremely high rate. The video data (video data stored in the VRAM 124) of the address designated by the address register 126 are read out and forwarded to the parallel/serial conversion part 128. The parallel/serial conversion part 128 converts the inputted video data of each address into serial data, which are outputted.

The output signal of the parallel/serial conversion part 128 is transmitted to the external display 116. The display 116 displays video based on the serial data (level information of each pixel).

When the information of the address (information stored in the VRAM i24) designated by the read out address register 126 are read out, the upper address comparison part 142 compares the upper address of the read out address register 126 and the upper address stored in the write in upper address memory part 141. When both agree, the upper address comparison part 142 converts the gate 143 to the conductive condition. When both do not agree, the upper address comparison part 142 converts the gate 143 to the cut off condition.

When the gate 143 is in the conductive condition, the video data outputted by the VRAM 124 are inputted into the compression part 131. The compression part 131 inputs only the video data of the upper address which includes the address to which new video data have been written in. As for the upper address wherein the video data are not rewritten at all, those video data are not inputted into the compression part 131.

The compression part 131 compresses the inputted video data. The compression method is arbitrary. For example, after carrying out an encoding conversion such as a DCT (discrete cosine transform), compression of the information amount is carried out by means of a run length method. In addition, an entropy coding such as Huffman coding may be carried out. The RAM 132 is a memory for the compression part 131 to store the inputted video data temporarily and to write in the video data after compression. The compression part 131 outputs the video data of which the information amount is compressed.

The multiplexer 133 inputs the video data (output signal of the compression part 131), of which the information amount is compressed, and the upper address information outputted by the upper address comparison part 142 (upper row address and upper column address), and multiplexes and outputs these pieces of information.

The multiplexer 133 erases the outputted upper address from the write in upper address memory part 141.

The information outputted by the compression part 131 is the information which has the unit of a rectangular region specified by the upper row address and the upper column address. Accordingly, the multiplexer 133 multiplexes and outputs the upper row address and the upper column address as well as the compressed video data and, thereby, the second terminal apparatus can identify the compressed video data as information of some definite address.

The parallel/serial conversion part 134 inputs the output signal of the multiplexer 133 and converts it to a serial signal so as to be outputted.

The wireless communication part 114 inputs the output signal of the parallel/serial conversion part 134 so as to transmit it in a wireless manner.

In comparison with the case where all data of each pixel stored in the VRAM 124 are transmitted without change, the information amount transmitted in a wireless manner is much smaller in the transmission system for video information of Embodiment 1. Accordingly, wireless transmission of video information becomes possible.

The wireless communication part 114 receives information transmitted from the second terminal apparatus (instructions or the like through a pen input) and transmits it to the input/output part 115. The input/output part 115 transmits the information transmitted from the second terminal apparatus to the CPU 111 through the PCI bus 112.

FIG. 2 is a block diagram of the second terminal apparatus 102 in a computer, according to Embodiment 1 of the present invention, which has a first terminal apparatus and a second terminal apparatus (a transmission apparatus for video information and a transmission system for video information which are included in a computer are primarily shown).

In FIG. 2, the second terminal apparatus 102 has a wireless communication part 201, a video graphics control part 202, a display 203 (display part) and a pen input part 204.

The video graphics control part 202 has a CPU 211, a serial/parallel conversion part 212, a demultiplexer 213, an expansion part 214, a RAM 215, an input/output part 216, a write in/read out address register 217, a VRAM 218, a read out address register 219 and a clock generator 220.

The wireless communication part 201, the video graphics control part 202 (CPU 211, demultiplexer 213, expansion part 214 and input/output part 216) and the pen input part 204 are connected to each other via an internal bus 205.

The display 203 has a pixel driving part 231, a display line control part 232 and a display screen 233 which includes a great number of pixels.

The wireless communication part 201 receives the serial signal transmitted by the wireless communication part 114 of the first terminal apparatus 101. The serial/parallel conversion part 212 converts the serial signal received by the wireless communication part 201 into a parallel signal, which is outputted. The demultiplexer 213 inputs the output signal of the serial/parallel conversion part 212 and divides it into the compressed video data and the upper address information (upper row address and upper column address). The compressed video data are inputted into the expansion part 214. The expansion part 214 expands the compressed video data and outputs the original video data (data of each pixel). The RAM 215 is a memory utilized by the expansion part 214 to expand the compressed video data.

The CPU 211 reads out the upper address information (upper row address and upper column address) from the demultiplexer 213 via the internal bus 205 and transmits the upper address information to the input/output part 216. The initial values of the lower bits, which are not included in the upper address, are all 0.

The CPU 211 reads out the data of each pixel in sequence from the expansion part 214 via the internal bus 205 and transmits the data of each pixel to the input/output part 216. Whenever the data of one pixel are read out and transmitted to the input/output part 216, the column address is incremented with a value of 1. In the case that the column address exceeds the maximum value, the lower bits of the column addresses are all converted to 0 and the row addresses are incremented with a value of 1. Whenever the data of one pixel are read out and transmitted to the input/output part 216, an increment of column addresses with a value of 1 is repeated.

An address is written into the write in/read out address register 217 through the input/output part 216 and the data of each pixel are written into this address of the VRAM 218.

The clock generator 220 sets the read out address register 219. The set value of the address register 219 is generally incremented at an extremely high rate. The information of the address designated by the address register 219 are read out (information stored in the VRAM 218) and are forwarded to the pixel driving part 231 of the display 203. When the data for one row (level information of each pixel) are stored in the pixel driving part 231, pixels of the row designated by the display line control part 232 are displayed. The display line control part 232 operates by inputting a clock outputted by the clock generation part 220. By displaying pixels of each row in sequence, the display screen 233 displays video information as a whole.

The user can input instructions for the computer through the pen input part 204 provided on the display. The CPU 211 transmits the inputted instructions from the pen input part 204 to the wireless communication part 201. The wireless communication part 201 transmits the input instructions.

<Description of Transmission Method for Video Information>

Figure 4:
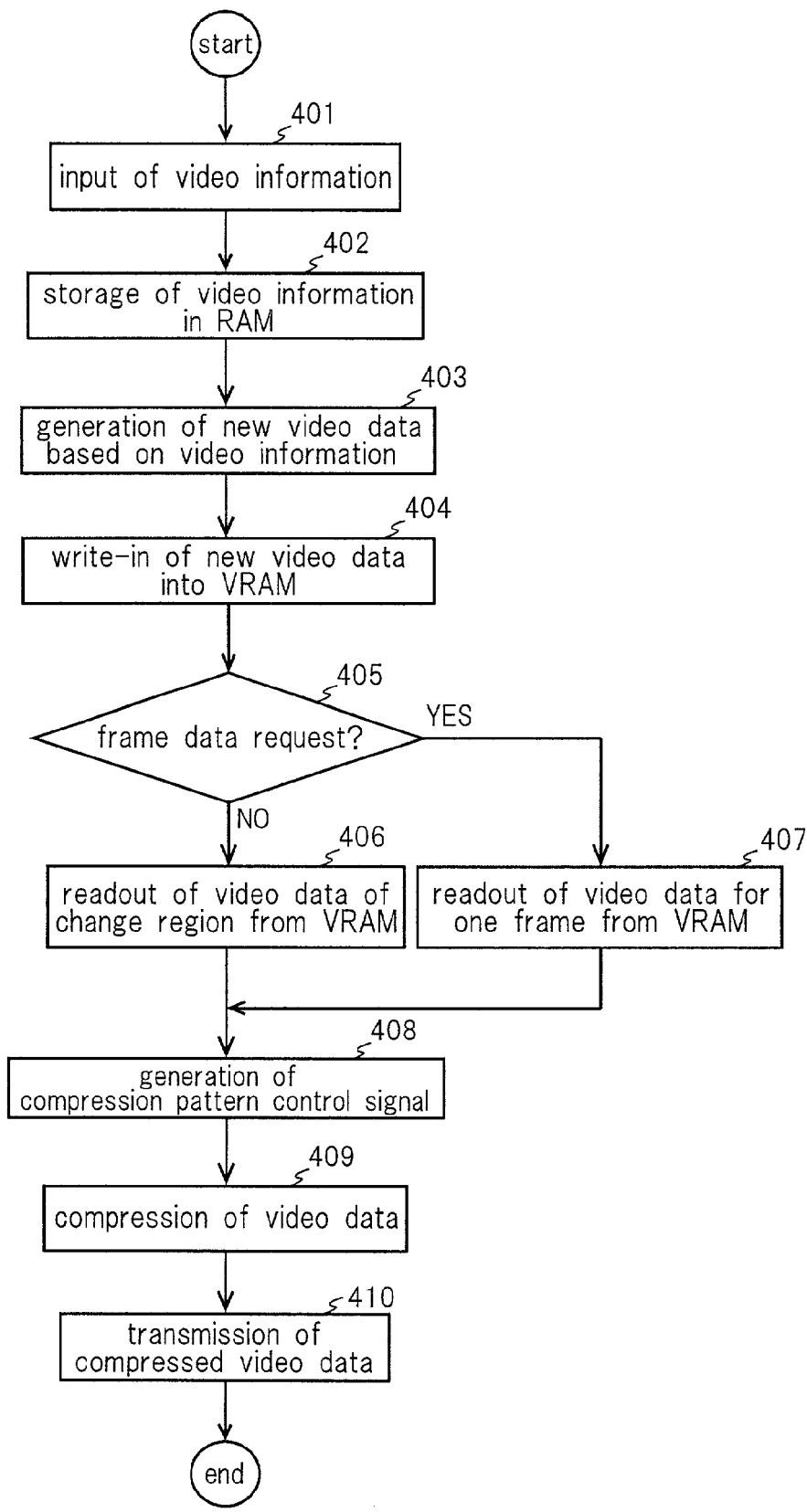
FIG. 4 is a flow chart at the transmission end of a transmission method for video information using a transmission apparatus or a transmission system of Embodiment 1.
Figure 5:
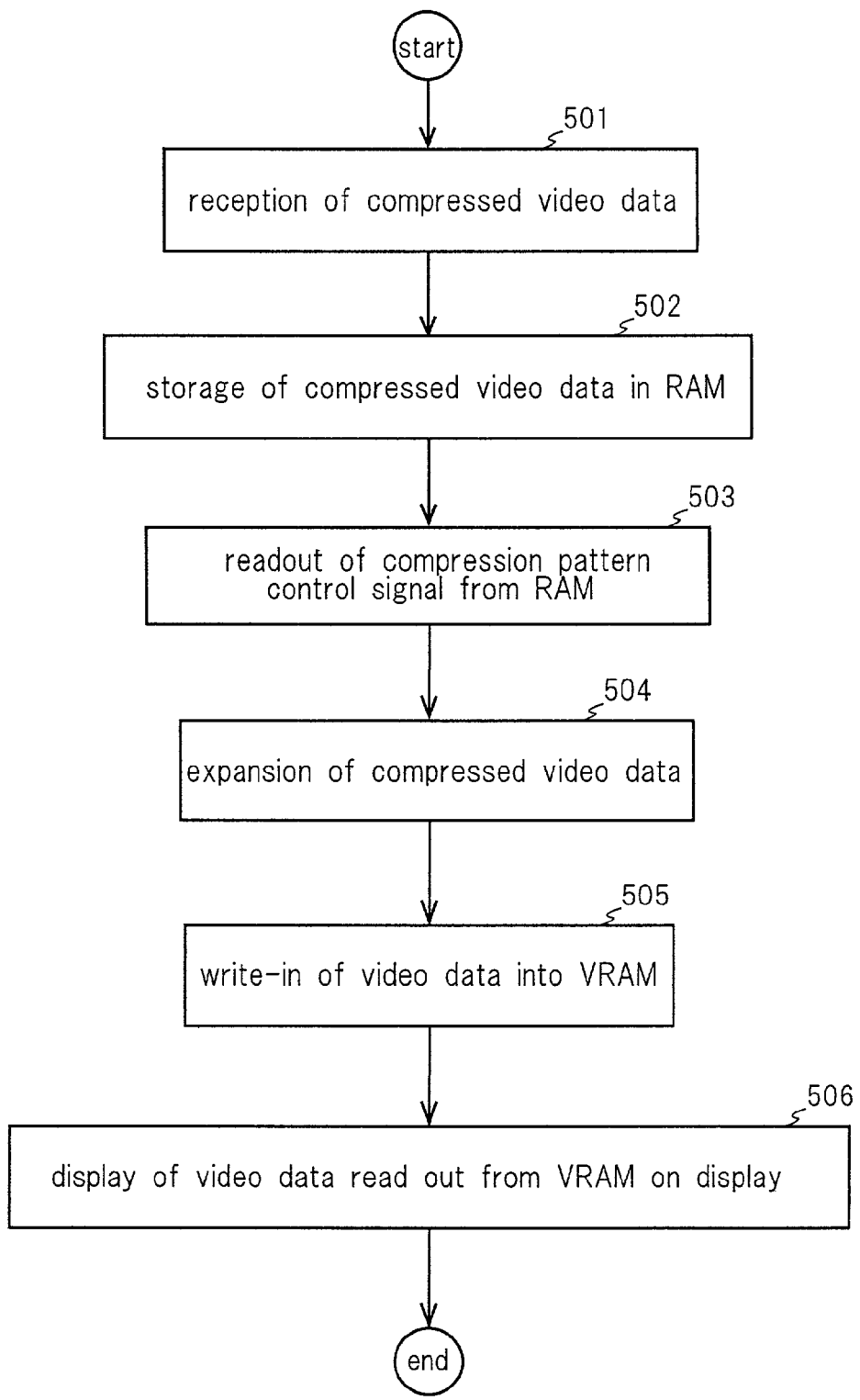
FIG. 5 is a flow chart at the reception end of a transmission method for video information using a transmission apparatus or a transmission system of Embodiment 1.

In reference to FIGS. 4 and 5, the transmission method for the video information of Embodiment 1 is described.

FIG. 4 is a flow chart at the transmission end (first terminal apparatus 101) of the transmission method for video information using a transmission apparatus and a transmission system of Embodiment 1.

First, the video graphics control part 113 inputs video information written in a software language generated by the CPU 111 (Step 401). Next, the video graphics control part 113 inputs the video information to a RAM (Step 402). Next, the video graphics control part 113 decodes the inputted video information by using the video information decoder and generates new video data (level information for each pixel) (Step 403). Next, the video graphics control part 113 writes in new video data to the VRAM (Step 404).

Next, it is checked whether a frame data transmission request, which is generated at constant intervals of time, is generated or not (Step 405). In the case that a frame data transmission request is generated, the procedure proceeds to Step 407 and in the case that a frame data transmission request is not generated, the procedure proceeds to Step 406.

In Step 406, video data of the change region (rectangular region, including the region wherein the level information of each pixel is rewritten based on the inputted video information) are read out from the VRAM. Then, the procedure proceeds to Step 408.

In Step 407, video data for one frame are read out from the VRAM. The procedure proceeds to Step 408.

In Step 408, a compression pattern control signal is generated (Step 408). In the case that video data of regions defined by a plurality of upper addresses are transmitted at the same time, the compression pattern control signal is utilized. The compression pattern control signal is information representing the form of a large region in the case that a plurality of regions become grouped together so as to form a large region. The compression pattern control signal is two-bit data, which is 01 in the case that the regions defined by a plurality of upper addresses continue laterally, 10 in the case that the regions defined by a plurality of upper addresses continue longitudinally, 11 in the case that the regions defined by a plurality of upper addresses form a rectangular region and 00 in the case that the regions defined by a plurality of upper addresses are independent of each other (see FIG. 10).

Next, in Step 409, the video data of the region defined by the upper address outputted from the VRAM 124 are compressed. In the case that the regions defined by a plurality of upper addresses continue, these are collectively compressed in accordance with the compression pattern control signal. As for compression, in general, the larger the information amount becomes, the more the compression ratio of the information amount increases.

Next, in Step 410, the compression pattern control signal, the upper address of the region located at the front (located at the upper left corner in the screen) of the region included in each compression pattern control signal, the upper address of the region located at the end (located at the lower right corner in the screen) of the region included in each compression pattern control signal (omitted in the case that the compression pattern control signal is 00) and the compressed video data are multiplexed and the multiplexed signal is transmitted.

FIG. 5 is a flow chart at the reception side (second terminal apparatus 102) of a transmission method for video information using the transmission apparatus and the transmission system of Embodiment 1.

First, in Step 501, the wireless reception part 201 of the second terminal apparatus 102 receives a multiplexed signal including compressed video data.

Next, the compression pattern control signal, the upper address of the region located at the front (located at the upper left corner in the screen) of the region included in each compression pattern control signal, the upper address of the region located at the end (located at the lower right corner in the screen) of the region included in each compression pattern control signal (omitted in the case that the compression pattern control signal is 00) and the compressed video data are separated from the multiplexed signal and the compressed video data are stored in the RAM 215 (Step 502).

Next, the CPU 211 reads out the compression pattern control signal, the upper address of the region located at the front (located at the upper left corner in the screen) of the region included in each compression pattern control signal and the upper address of the region located at the end (located at the lower right corner in the screen) of the region included in each compression pattern control signal (omitted in the case that the compression pattern control signal is 00) (Step 503).

Next, the expansion part 214 expands the compressed video data (Step 504).

Next, the expanded video data are written into the addresses, starting from the address located at the front (located at the upper left corner in the screen) of the region of the video data in the VRAM 218 up to the address located at the end (located at the lower right corner in the screen) of the region of the video data (Step 505).

Next, the video data read out from the VRAM 218 with the read out address register 219 are displayed on the display 203 in sequence (Step 506).

FIG. 10 is a diagram for describing the compression pattern control signal. The compression pattern control signal is the information representing the form of the large region in the case that a plurality of regions are grouped to form a large region. The compression pattern control signal consists of 2 bit data, which is 01 in the case that the regions defined by a plurality of upper addresses continue laterally as shown in part (a) of FIG. 10, 10 in the case that the regions defined by a plurality of upper addresses continue longitudinally as shown in parts (b) of FIG. 10, 11 in the case that the regions defined by a plurality of the upper addresses form a rectangular region as shown in part (c) of FIG. 10 and 00 in the case that the regions defined by a plurality of upper addresses are independent of each other.

In the case that a plurality of regions defined by upper addresses continue, a method for grouping the regions is described in reference to FIGS. 11, 12, 13 and 14.

Figure 13:
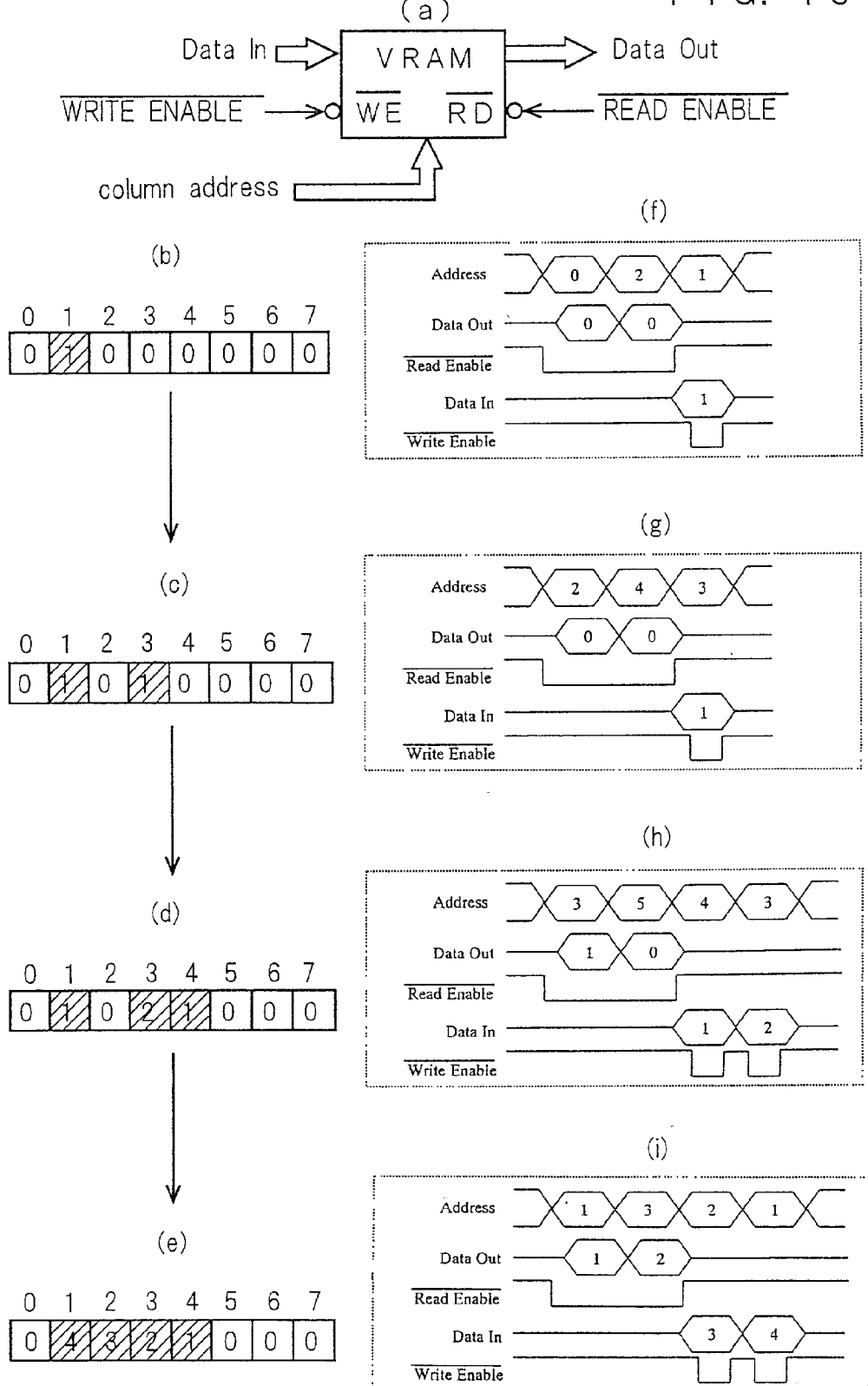
FIG. 13 is a diagram showing data written into the write in upper address memory part in the case that a method for grouping regions continuing only in the lateral direction is used.
Figure 15:
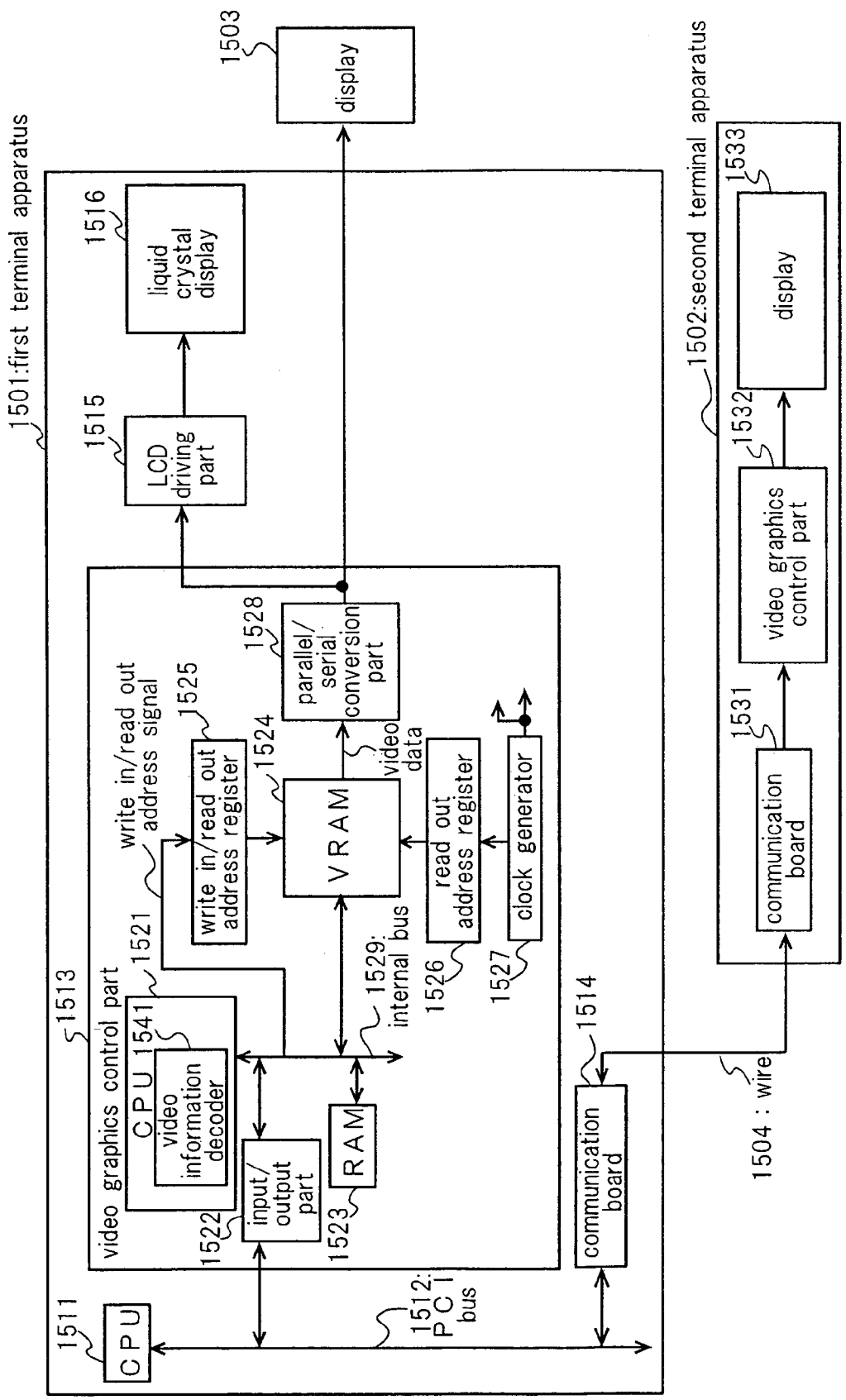
FIG. 15 is a block diagram of a conventional computer which has a first terminal apparatus and a second terminal apparatus.

FIGS. 11 and 13 illustrate a method for grouping only the regions which continue in the lateral direction.

FIGS. 12 and 14 illustrate a method for grouping the regions which continue in the lateral direction and in the longitudinal direction.

In reference to FIGS. 11 and 13, the method for grouping only the regions which continue in the lateral direction, is described.

The entire screen of part (a) of FIG. 11 shows the entire screen of the display and the hatched blocks show blocks whose representations have been changed. Since the white blocks have not changed in the representation, it is not necessary to transmit the video data thereof.

When the video data are displayed in part (a) of FIG. 11, the transmission apparatus for video information (or transmission system, transmission method for video information) generates nine groups of A to I shown in part (b) of FIG. 11 or eight groups of A to H shown in part (c) of FIG. 11. Part (b) of FIG. 11 illustrates a method of grouping only the hatched blocks into a continuous region. Part (c) of FIG. 11 illustrates a method for grouping the hatched blocks into a continuous region according to an algorithm which allows blocks without hatch, the number of which is a constant number or less, to be incorporated into a group in the case that the size of the grouping becomes a constant or more.

FIG. 13 illustrates a method for grouping only the regions which continue in the lateral direction. Part (a) of FIG. 13 simply shows the dual port structure of the VRAM. The VRAM can write in video data by controlling a WRITE ENABLE terminal and at the same time can read out video data by controlling READ ENABLE terminal.

Parts (b) to (i) of FIG. 13 show how the groups of blocks change as the hatched blocks shown in the first row of FIG. 11 are changed one by one.

FIG. 13 shows the appearance of the blocks whose upper addresses are (1, 0), (3, 0), (4, 0) and (2, 0) when the blocks are changed in sequence.

First, the block of (1, 0) is changed (part (b) of FIG. 13). The CPU 121 stores the change of this block in the write in upper address memory part 141. Before the CPU 121 writes 1 into the address (1, 0) of the write in upper address memory part 141 (0 represents no change while 1 or more, represents a change), the values of the left and right addresses (0, 0) and (2, 0) thereof are checked (part (f) of FIG. 13). Since the values of the left and right addresses are both 0, the address (1, 0) is found to be an isolated region.

Next, the block of (3, 0) is changed (part (c) of FIG. 13). The CPU 121 stores the change of this block in the write in upper address memory part 141. Before the CPU 121 writes 1 into the address (3, 0) of the write in upper address memory part 141, the values of the left and the right addresses, (2, 0) and (4, 0), are checked (part (g) of FIG. 13). Since the values of the left and the right addresses are both 0, the address (3, 0) is found to be an isolated region.

Next, the block of (4, 0) is changed (part (d) of FIG. 13). The CPU 121 stores the change of this block in the write in upper address memory part 141. Before the CPU 121 writes 1 in the address (4, 0) of the write in upper address memory part 141, the values of the left and the right addresses (3, 0) and (5, 0) thereof are checked (part (h) of FIG. 13). Since the value of the left address (3, 0) is 1 while the value of the right address (5, 0) is 0, the address (4, 0) is found to be a region which continues to the left address (3, 0). Therefore, 1 is written into the address (4, 0) while 2 is written into the address (3, 0). 2 represents that there is a change and that two changed regions continue.

Next, the block of (2, 0) is changed (part (e) of FIG. 13). The CPU 121 stores the change of this block in the write in upper address memory part 141. Before the CPU 121 writes 1 into the address (2, 0) of the write in upper address memory part 141, the values of the left and the right addresses (1, 0) and (3, 0) are checked (part (i) of FIG. 13). Since the value of the left address (1, 0) is 1 while the value of the right address (3, 0) is 2, the address (2, 0) is found to be a region which continues to the left and the right addresses (1, 0) and (3, 0). Therefore, 3 is written into the address (2, 0) while 4 is written into the address (1, 0). 4 represents that there is a change and that four changed regions continue.

Though not illustrated in part (i) of FIG. 13, next, the value of the address (0, 0) is read out so as to check that the value of the address (0, 0) is 0.

In this manner, the upper address of the changed regions and the number of the changed regions which continue from left to right are stored in the write in upper address memory part 141.

FIGS. 12 and 14 illustrate a method for grouping regions that continue in the lateral direction and in the longitudinal direction. In reference to FIGS. 12 and 14, a method for grouping regions which continue in the lateral direction and in the longitudinal direction is described.

The entire screen of part (a) of FIG. 12 shows the entire display screen of the display and the hatched blocks show the blocks whose representations have been changed. Since the representations have not been changed in white blocks, it is not necessary to transmit the video data thereof.

When the video data are displayed in part (a) of FIG. 12, the transmission apparatus for video information (or transmission system, transmission method for video information) generates seven groups of A to G shown in parts (b) and (c) of FIG. 12, five groups of A to E shown in part (d) of FIG. 12 or four groups of A to D shown in part (e) of FIG. 12.

Parts (b) and (c) of FIG. 12 illustrate a method for grouping only the hatched blocks into continuous regions. Parts (d) and (e) of FIG. 12 illustrate a method for grouping the hatched blocks into continuous regions according to an algorithm which allows blocks without hatch, the number of which is a constant number or less, to be incorporated into a group in the case that the size of the grouping becomes a constant or more.

FIG. 14 illustrates a two dimensional data written into the write in upper address memory part 141 in the case that a method is used for grouping regions which continue in the longitudinal direction and in the lateral direction. In FIG. 13, a group of changed blocks which continue only in the lateral direction is generated. FIG. 14 shows the result gained by carrying out the above not only in the lateral direction but also in the longitudinal direction. A group of changed blocks is generated based on these two dimensional data written into the right in upper address memory part 141.

For example, first, in the block of the address (1, 0) the value (4, 1), which is not 0, is found. From the value of (4, 1) a block A (including the addresses (1, 0) to (4, 0)) which has the length of 1 in the longitudinal direction and which has the length of 4 in the lateral direction is defined.

Next, in the block of the address (2, 1) the value (3, 4), which is not 0, is found. Since the values stored in the addresses (2, 1) to (4, 1) are (3, 4), (2, 2) and (1, 2), a block B (including the addresses (2, 1), (3, 1), (4, 1), (2, 2), (3, 2) and (4, 2)) which has the length of 2 in the longitudinal direction (the minimum value among the second values 4, 2 and 2) and which has the length of 3 in the lateral direction (determined from 3 of (3, 4)) is defined.

In the same manner, next, in the block of the address (2, 3), the value (1, 2), which is not 0, is found. Since the values stored in the addresses (2, 3) and (2, 4) are (1, 2) and (3, 1), a block C (including the addresses (2, 3) and (2, 4)) which has the length of 2 in the longitudinal direction (determined from 2 of (1, 2)) and which has the length of 1 in the lateral direction (determined from 1 of (1, 2)) is defined.

In the following, in the same manner, groups of the changed regions shown in part (c) of FIG. 13 are formed.

In another embodiment, the number of regions and the upper address of each region are transmitted to the compressed video data in place of the compression pattern control signal, the upper address of the region located at the front of the region included in each compression pattern control signal and the upper address of the region located at the end of the region included in each compression pattern control signal. In this case, it does not matter whether each region defined by the upper address is a continuous region or a discontinuous region, or whether the region is a laterally continuous region or is a longitudinally continuous region. The first terminal apparatus groups, compresses and transmits all of the video data.

The second terminal apparatus receives and expands the compressed video data. The expanded video data are written into a region defined by each of the upper addresses of the VRAM.

In the transmission apparatus for video information and the transmission system for video information of Embodiment 2, the video data of the region wherein the video data has changed are compressed, transmitted and received, and therefore, necessary video information can be transmitted through a transmission of a small amount of information.

EMBODIMENT 2

In reference to FIGS. 6 to 9, a transmission apparatus for video information, a transmission system for video information and a transmission method for video information of Embodiment 2 are described.

The transmission apparatus for video information and the transmission system for video information of Embodiment 2 are included in a computer which has a first terminal apparatus and a second terminal apparatus, as shown in FIG. 3.

<Description of the Configurations of the Transmission Apparatus for Video Information and the Transmission System for Video Information>

Figure 6:
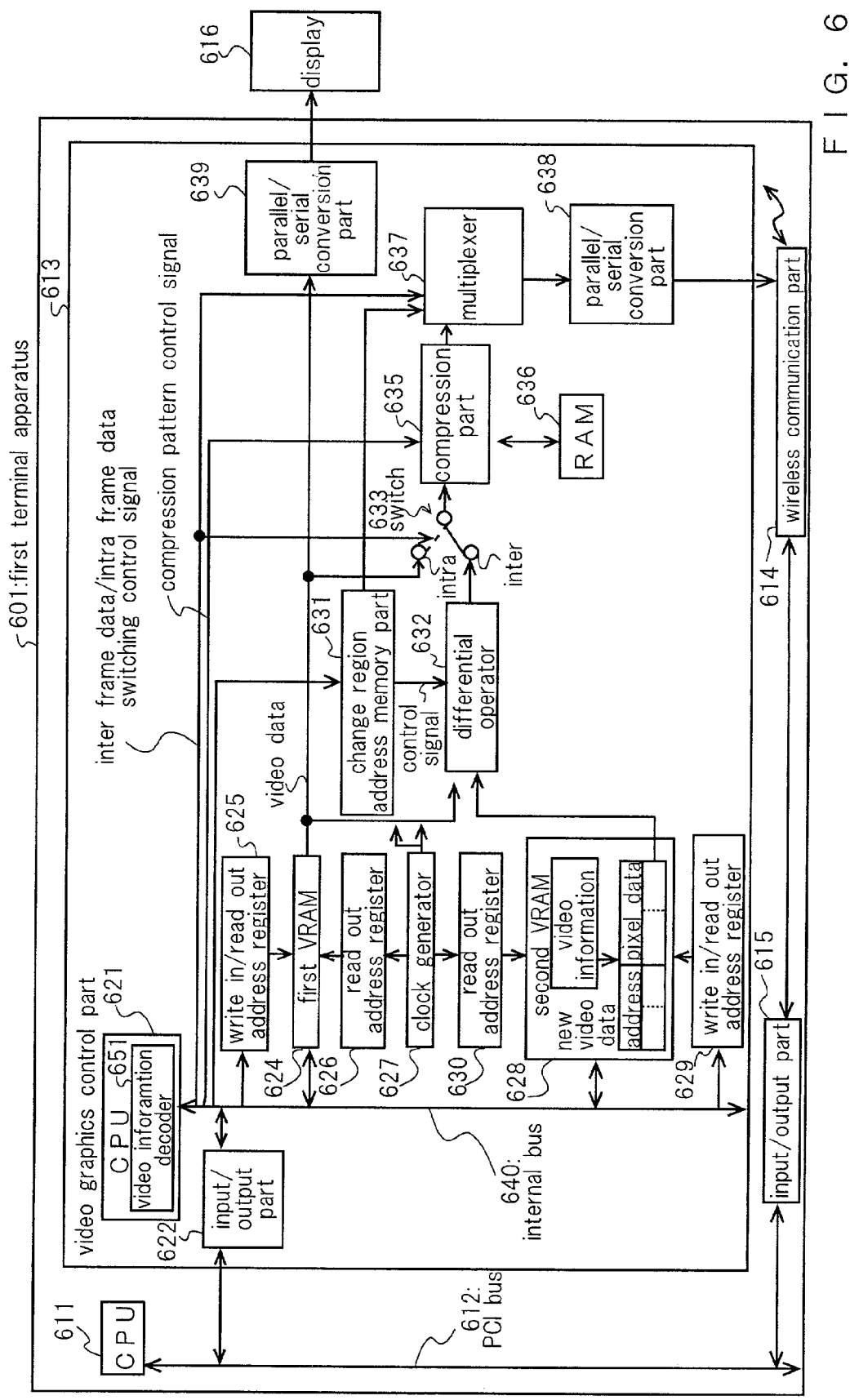
FIG. 6 is a block diagram of a first terminal apparatus in a computer according to Embodiment 2.
Figure 7:
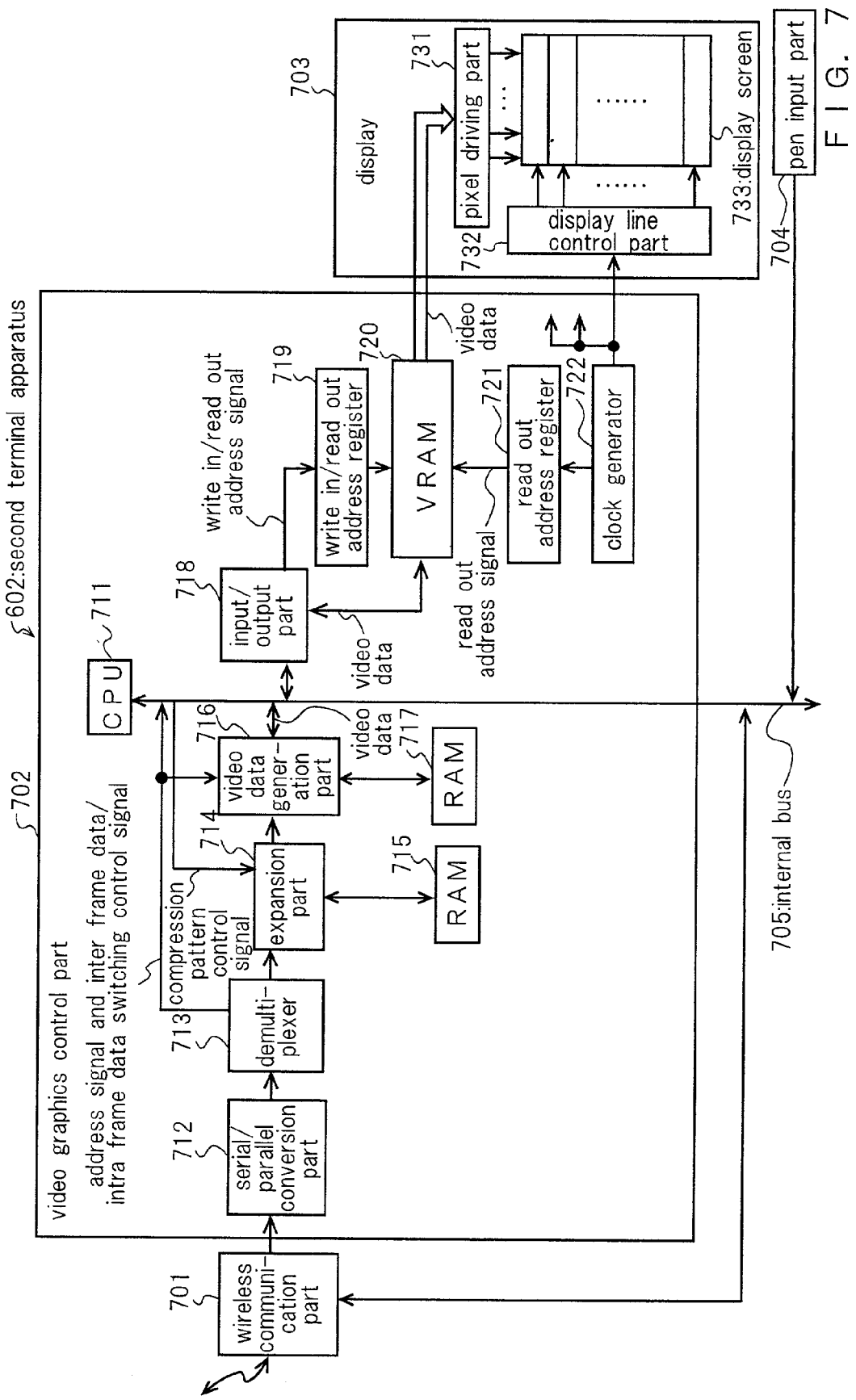
FIG. 7 is a block diagram of a second terminal apparatus in a computer according to Embodiment 2.

In reference to FIGS. 6 and 7, the configurations of the transmission apparatus for video information and the transmission system for video information included in the computer of Embodiment 2 of the present invention which has a first terminal apparatus and a second terminal apparatus are described.

FIG. 6 is a block diagram (showing primarily a transmission apparatus for video information and a transmission system for video information included in a computer) of the first terminal apparatus 601 in the computer of Embodiment 2 of the present invention which has a first terminal apparatus and a second terminal apparatus.

In FIG. 6, the first terminal apparatus 601 has a CPU 611, a video graphics control part 613, a wireless communication part 614 and an input/output part 615. An external display 616 can be connected to the first terminal apparatus 601.

In FIG. 6, though indispensable for a computer, the descriptions of a ROM, a RAM or the like which do not relate directly to the present invention are omitted.

The CPU 611, the video graphics control part 613 and the input/output part 615 are connected to each other via the PCI bus 612.

The video graphics control part 613 has a CPU 621, an input/output part 622, a first VRAM 624, a write in/read out address register 625 of the first VRAM 624, a read out address register 626 of the first VRAM 624, a clock generator 627, a second VRAM 628, a write in/read out register 629 of the second VRAM 628, a read out address register 630 of the second VRAM 628, a change region address memory part 631, a differential operator 632, an inter/intra switch 633, a compression part 635, a RAM 636, a multiplexer 637 and parallel/serial conversion parts 638 and 639.

The CPU 621, the input/output part 622, the first VRAM 624, the write in/read out address register 625 of the first VRAM 624, the second VRAM 628, the write in/read out address register 629 of the second VRAM 628, the change region address memory part 631, the compression part 635 and the inter/intra switch 633 and the like are connected to each other via an internal bus 640.

The CPU 611 transmits video change instructions described in a software language (for example, DirectX) to the video graphics control part 613 via the PCI bus 612.

The input/output part 622 of the video graphics control part 613 transmits the inputted video change instructions described in a software language to the CPU 621 via the internal bus 640.

The CPU 621 converts the video change instructions (video information) described in a software language (program arranged on the Application Programming Interface of the OS of this computer) to the level information of each pixel at a hardware level (for example, information regarding which number the data of any address of the VRAM are changed to) by utilizing the video information decoder 651. The second VRAM 628 includes a scratch region at the time of generating level information (referred to as "video data") of each pixel by utilizing the video information decoder 651.

The first VRAM 624 is a dual port RAM for video display which has a port that can write in or read out by randomly accessing an arbitrary address (the address is designated by the write in/read out address register 625) and a port which can read out the data of each address at a high rate and in a constant order (address is designated by the read out address register 626). The level information of each pixel (level information of each of the sub pixels RGB), attribute data and the like are stored in the first VRAM 624.

The second VRAM 628 is a dual port RAM for video display which has a port that can write in or read out by randomly accessing an arbitrary address (the address is designated by the write in/read out address register 629) and a port which can read out the data of each address at a high rate and in a constant order (address is designated by the read out address register 630). After writing the inputted video information into the second VRAM 628, the CPU 621 decodes this and stores the decoded video data of each pixel (level information of each of the sub pixels RGB), attribute data and the like in a predetermined place of the second VRAM 628. At this stage new video data are written into the second VRAM 628 and are not written into the first VRAM 624.

The CPU 621 or the like sets addresses in the write in/read out address registers 625 and 629. The video data are written into the respective addresses of the first VRAM 624 and the second VRAM 628 via the internal bus 640 and the video data are read out from the respective addresses via the internal bus 640.

The CPU 621 stores the upper bits of the write in addresses set in the write in/read out address register 629 in the change region address memory part 631. In the case that the write in address is assumed to be formed of the h-bit row address data and the k-bit column address data, the write in upper address memory part 141 stores the upper i bits (i is an arbitrary integer satisfying $1 \leq i \leq h-1$) of the row address data and the upper j bits (j is an arbitrary integer satisfying $1 \leq j \leq k-1$) of the column address data.

Thereby, the upper address of the address of the second VRAM 628, to which new data are written in, is stored.

The clock generator 627 sets the read out address registers 626 and 630. The set values of the address registers 626 and 630 are generally incremented at an extremely high rate. The video data (video data stored in the first VRAM 624 and video data stored in the second VRAM 628) of the address designated by the address registers 626 and 630 are read-out.

The video data read out from the first VRAM 624 are transmitted to the differential operator 632, the intra input terminal of the inter/intra switch 633 and the parallel/serial conversion part 639. The parallel/serial conversion part 639 converts the inputted video data of each address into serial data, which are outputted.

The output signal of the parallel/serial conversion part 639 is transmitted to the external display 616. The display 616 displays video based on the serial data (video data of each pixel).

The video data read out from the second VRAM 628 is transmitted to a differential operator 632.

The differential operator 632 inputs the video data read out from the first VRAM 624, the video data read out from the second VRAM 628 and an output signal (address of change region) of the change region address memory part 631 and carries out an operation to find the difference of the video data in the change region (=(video data read out from the second VRAM 628)−(video data read out from the first VRAM 624)).

The differential information resulting from the operation is transmitted to the inter input terminal of the inter/intra switch 633.

The inter/intra switch 633 usually transmits a signal inputted to the inter input terminal to the compression part 635 (referred to as "inter mode"). When a frame data request signal (occurs periodically) occurs, the inter/intra switch 633 transmits the signal inputted to the intra input terminal to the compression part 635 (referred to as "intra mode").

In the inter mode, the compression part 635 inputs the differential information of the change region and compresses the information amount of the differential information by using the RAM 636. In the intra mode, the compression part 635 inputs the video data of each pixel for one frame and compresses the information amount by using the RAM 636. The compression method is the same method of the compression part 131 of Embodiment 1.

The compressed differential information (or compressed video data of each pixel for one frame), the output signal of the change region memory part 631 (upper address data of change region) and the instruction signal from the CPU 621 (signal for designating the inter mode or the intra mode, or the like) are inputted to the multiplexer 637, which multiplexes and outputs these pieces of information.

The parallel/serial conversion part 638 inputs the multiplexed information and converts them into a serial signal so as to be outputted.

The wireless communication part 614 inputs the serial signal and transmits it in a wireless manner.

The CPU 621 copies the video data of each pixel in the change region from the second VRAM 628 to the first VRAM 624 after the transmission is completed. The CPU 621 erases the address list of the change region stored in the change region address memory part 631.

The wireless communication part 614 receives the information transmitted from the second terminal apparatus (instructions through a pen input, or the like) and transmits it to the input/output part 615. The input/output part 615 transmits the information transmitted from the second terminal apparatus to the CPU 611 through the PCI bus 612.

FIG. 7 is a block diagram of the second terminal apparatus 602 in a computer according to Embodiment 2 of present invention which has a first terminal apparatus and a second terminal apparatus (showing primarily a transmission apparatus for video information and a transmission system for video information included in the computer).

In FIG. 7, the second terminal apparatus 602 has a wireless communication part 701, a video graphics control part 702, a display 703 (a display part) and a pen input part 704.

The video graphics control part 702 has a CPU 711, a serial/parallel conversion part 712, a demultiplexer 713, an expansion part 714, a RAM 715, an video data generation part 716, a RAM 717, an input/output part 718, a write in/read out address register 719, a VRAM 720, a read out address register 721 and a clock generator 722.

The wireless communication part 701, the video graphics control part 702 (the CPU 711, the demultiplexer 713, the video data generation part 716 and the input/output part 718) and the pen input part 704 are connected to each other via the internal bus 705.

The display 703 has a pixel driving part 731, a display line control part 732 and a display screen 733 which includes a great number of pixels.

The wireless communication part 701 receives a serial signal transmitted by the wireless communication part 614 of the first terminal apparatus 601. The serial/parallel conversion part 712 converts the serial signal received by the wireless communication part 701 into a parallel signal so as to be outputted. The demultiplexer 713 inputs the output signal of the serial/parallel conversion part 712 and separates it into the compressed differential information (or compressed video data of each pixel for one frame), the address data of the change region, a signal for designating the inter mode or the intra mode and the like.

In the inter mode, the compressed differential information are inputted into the expansion part 714. The expansion part 714 expands the compressed differential information and outputs the original differential information. The RAM 715 is a memory utilized by the expansion part 714 for expanding the compressed video data. The video data generation part 716 inputs the expanded differential information (output signal of the expansion part 714) and the current video data (output signal of the VRAM 720), and generates and outputs new video data (level information for each pixel). An operation is carried out based on the expression of new video data=current video data+differential information. The RAM 717 is a memory utilized by the video data generation part 716 for generating new video data.

In the intra mode, the compressed video data of each pixel for one frame are inputted to the expansion part 714. The expansion part 714 expands the compressed video data of each pixel for one frame and outputs the expanded video data of each pixel for one frame. The expanded video data of each pixel for one frame are inputted to the video data generation part 716 so as to be outputted without change.

The CPU 711 inputs the signal for designating the inter mode or the intra mode and the upper address data (upper row address and upper column address) of the change region from the demultiplexer 713 via the internal bus 705 and transmits them to the input/output part 718. The initial values of the lower bits, which are not included in the upper address, are all 0.

The CPU 711 sequentially reads out the level information of each pixel from the video data generation part 716 via the internal bus 705 and transmits the level information to the input/output part 718. Whenever the level information of one pixel is read out and transmitted to the input/output part 718, the column address is incremented with a value of 1. In the case that the column address exceeds the maximum value, the lower bits of the column address are all set at 0 and the row address is incremented with a value of 1. Whenever the data of one pixel are read out and transmitted to the input/output part 718, the operation of incrementing the column address with a value of 1 is repeated.

An address is written into the write in/read out address register 719 through the input/output part 718 and data of each pixel are written into this address of the VRAM 720.

The clock generator 722 sets the read out address register 721. The set value of the address register 721 is generally incremented at an extremely high rate. The information of the address designated by the address register 721 (level information of each pixel stored in the VRAM 720) are read out and forwarded to the pixel driving part 731 of the display 703. When the level information of each pixel for one row are stored in the pixel driving part 731, the pixels of the row designated by the display line control part 732 are displayed. The clock outputted by the clock generation part 722 is inputted to the display line control part 732, enabling the operation thereof. The display screen 733 displays video information as a whole by sequentially displaying pixels of each row.

The user can input instructions for the computer through the pen input part 704 provided on the display. The CPU 711 transmits the inputted instructions to the wireless communication part 701 from the pen input part 704. The wireless communication part 701 transmits the inputted instructions.

<Description of the Transmission Method for Video Information>

Figure 8:
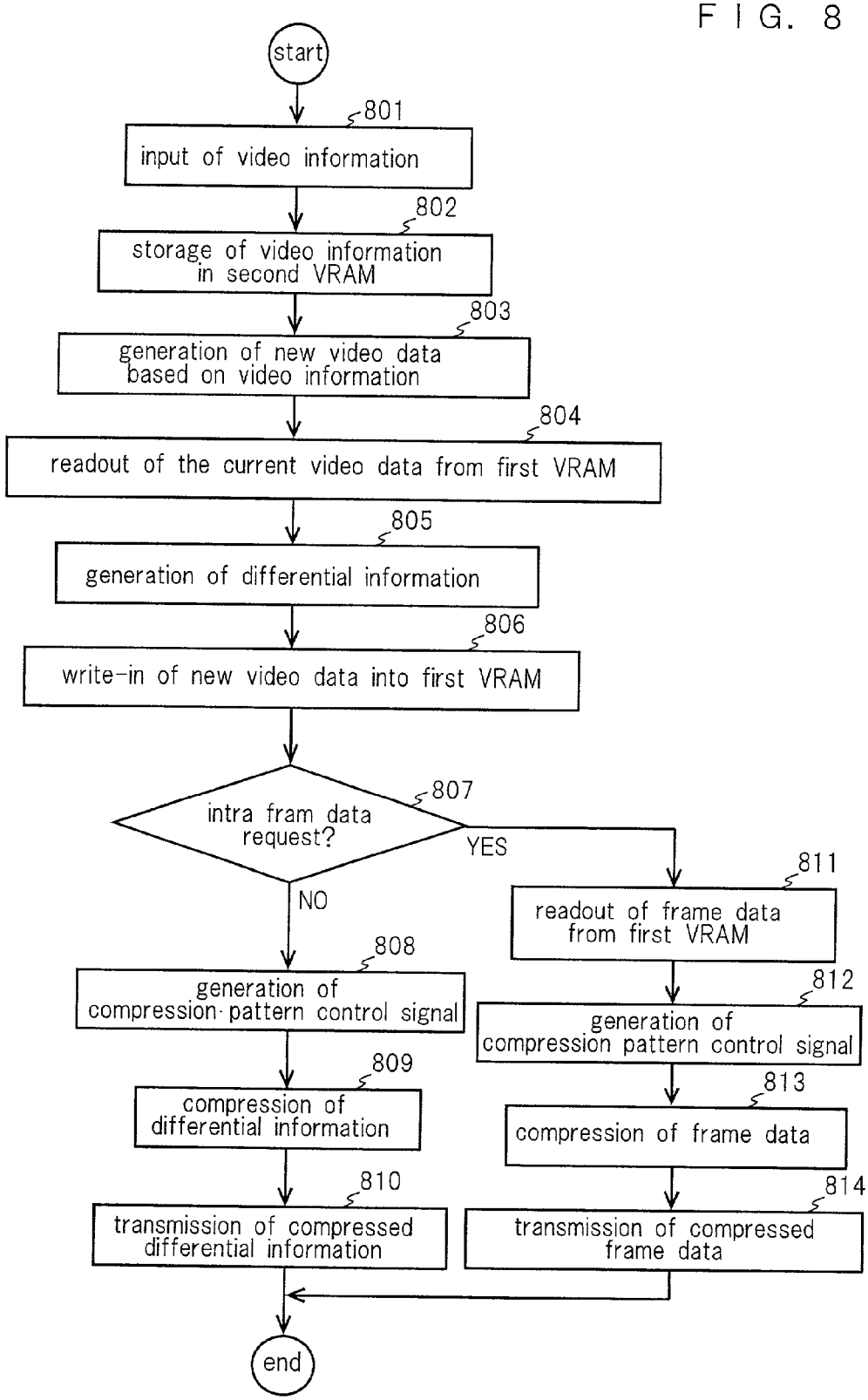
FIG. 8 is a flow chart at the transmission end of a transmission method for video information using a transmission apparatus or a transmission system of Embodiment 2.
Figure 9:
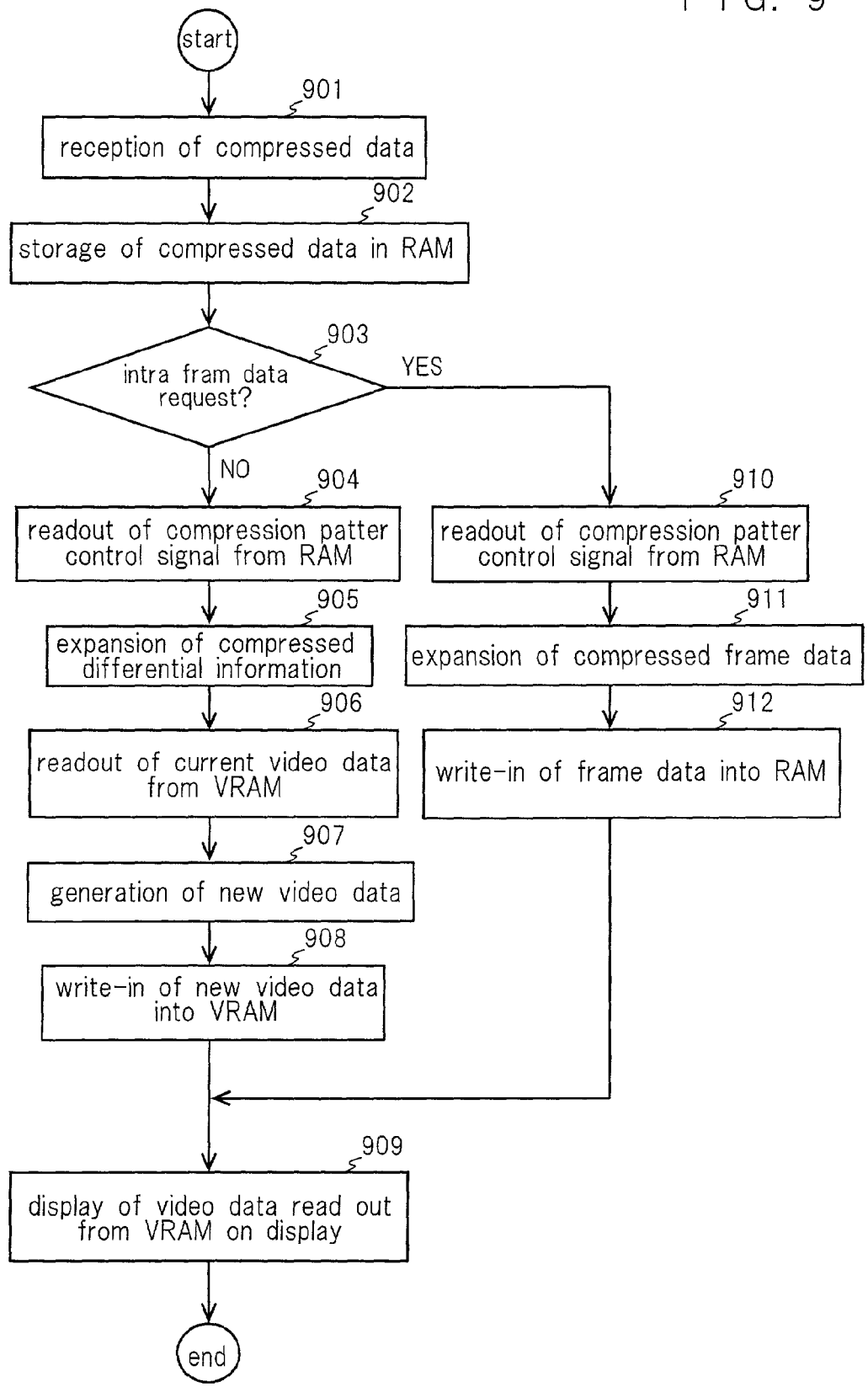
FIG. 9 is a flow chart at the reception end of a transmission method for video information using a transmission apparatus or a transmission system of Embodiment 2.

In reference to FIGS. 8 and 9, a transmission method for video information of Embodiment 2 is described.

FIG. 8 is a flow chart at the transmission end (first terminal apparatus 601) of the transmission method for video information using the transmission apparatus and the transmission system of Embodiment 2.

First, the video graphics control part 613 inputs the video information written in a software language that is generated by the CPU 611 (Step 801). Next, the video graphics control part 613 inputs the video information into the second VRAM 628 (Step 802). Next, the video graphics control part 613 decodes the inputted video information by using the video information decoder and generates new video data (level information of each pixel) (Step 803). Next, the video graphics control part 613 reads out the current video data from the first VRAM 624 and reads out new video data from the second VRAM (Step 804).

Next, the video graphics control part 613 subtracts the current video data from the new video data so as to generate the differential information (Step 805).

Next, the video graphics control part 613 writes the new video data into the first VRAM 624 (Step 806).

Next, it is checked whether an intra frame data transmission request, which occurs at constant intervals of time, occurs or not (Step 807). In the case that the intra frame data transmission request has occurred, the procedure proceeds to Step 811 while in the case that it has not occurred, the procedure proceeds to Step 808.

In Step 808, the video graphics control part 613 generates the compression pattern control signal (see Embodiment 1) of the change region. Next, the differential information is read out and the information amount of the differential information is compressed (Step 809). Next, a signal for designating the inter mode, the compression pattern control signal, the upper address of the region located at the front of the region included in each compression pattern control signal (located at the left upper corner in the screen), the upper address of the region located at the end of the region included in each compression pattern control signal (located at the lower right corner in the screen) and the compressed differential information are multiplexed, and the multiplexed signal is transmitted from the first terminal apparatus to the second terminal apparatus (Step 810). Then the procedure is completed.

In Step 811 (when the intra frame data transmission request occurs), the video graphics control part 613 reads out video data for one frame from the first VRAM 624. Next, the compression pattern control signal (11 in this case) is generated (Step 812). Next, the video data for one frame are compressed (Step 813). Next, a signal for designating the intra mode, the compression pattern control signal, the upper address of the region located at the front of the region included in each compression pattern control signal (located at the upper left corner in the screen), the upper address of the region located at the end of the region included in each compression pattern control signal (located at the lower right corner in the screen) and the compressed video data for one frame are multiplexed, and the multiplexed signal is transmitted from the first terminal apparatus to the second terminal apparatus (Step 814). Hereby, the procedure is completed.

FIG. 9 is a flow chart at the reception end (second terminal apparatus 602) of the transmission method for video information using the transmission apparatus and transmission system of Embodiment 2.

First, in Step 901, the wireless reception part 701 of the second terminal apparatus 602 receives the multiplexed signal which includes the compressed differential information (or compressed video data for one frame).

Next, a signal for designating the inter mode or the intra mode, the compression pattern control signal, the upper address of the region located at the front of the region included in each compression pattern control signal (located at the upper left corner in the screen), the upper address of the region located at the end of the region included in each compression pattern control signal (located at the lower right corner in the screen) (omitted in the case that the compression pattern control signal is 00) and the compressed differential information (or compressed video data for one frame) are separated from the multiplexed signal, and the compressed differential information (or compressed video data for one frame) are stored in the RAM 715 (Step 902).

Next, the signal for designating the inter mode or the intra mode is checked (Step 903). In the case of the intra mode, the procedure proceeds to Step 910. In the case of the inter mode, the procedure proceeds to Step 904.

In Step 904 (inter mode), the compression pattern control signal is read out from the RAM. Next, the compressed differential information is expanded (Step 905).

Next, the video graphics control part 702 reads out the current video data from the VRAM 720 (Step 906). Next, the differential information is added to the current video data so as to generate new video data (Step 907). Next, the new video data are written into the VRAM 720 (Step 908). Next, the video data read out from the VRAM are displayed on the display (Step 909). Hereby, the procedure is completed.

In Step 910 (intra mode) the compression pattern control signal is read out from the RAM. Next, the compressed video data for one frame are expanded (Step 911).

Next, new video data for one frame are written into the VRAM 720 (Step 912). Next, the video data read out from the VRAM are displayed on the display (Step 909). Hereby, the procedure is completed.

According to the present invention, all of the video information is not transmitted but, rather, only the information of the changed region is transmitted. In addition, by utilizing differential information of the data (difference between the previous data and the current data), the transmitted information amount can be further reduced.

According to the present invention, the advantageous effects can be gained wherein a transmission apparatus for video information, a transmission system for video information and a transmission method for video information can be implemented which enables the transmission of video information (in particular, transmission by wireless communication) at a low bit rate without regard to OS.

Although the invention has been described in some detail dealing with the preferred embodiments, the configuration details of any of the preferred embodiments disclosed herein may be changed or modified, and any changes in the combination or order of elements thereof can be accomplished without departing from the spirit and scope of the invention as set forth in the appended claims.

We claim:

1. A transmission apparatus for video information characterized by having:
   an input part for inputting video information transmitted by a central processing unit;
   a level information generation part for generating level information of each pixel on a screen based on at least said video information;
   a memory part for storing the level information of each pixel in the entire region of the screen;
   a region extraction part for extracting a changed region which is a region on the screen including pixels related to said video information;
   an update region level information generation part for generating level information of each pixel in said changed region based on, at least, either the level information of each pixel generated by said level information generation part or the level information of each pixel stored in said memory part;
   a compression part for compressing the information amount of level information of each pixel in said changed region; and
   a communication part for transmitting position information of said changed region and said compressed level information.

2. The transmission apparatus for video information according to claim 1 characterized in that said update region level information generation part generates differential information of the level information of each pixel in said changed region extracted based on, at least, the level information of each pixel generated by said level information generation part and the level information of each pixel stored in said memory part and said compression part compresses the differential information.

3. The transmission apparatus for video information according to claim 1, characterized in that said changed region is a region in a rectangular form including pixels of m rows and n columns (in, n are positive integers of 1 or more, respectively).

4. The transmission apparatus for video information according to claim 3, characterized in that said changed region is a set of pixels wherein the upper i bits of the row address (in the case that the row address is assumed to be data of h bits, i is a positive integer satisfying $1<i<(h-1)$) and the upper j bits of the column address (in the case that the column address is assumed to be data of k bits, j is a positive integer satisfying $1<j<(k-1)$) of each pixel on the screen are the same.

5. The transmission apparatus for video information according to claim 1, characterized in that said communication part is a wireless communication part.

6. The transmission apparatus for video information according to claim 1, characterized, in addition, in that:
   said memory part outputs level information of each pixel in the entire region of the screen to said update region level information generation part at least once or more, for every constant period of time;
   said compression part compresses the information amount of the level information of each pixel in said entire region of the screen; and
   said communication part transmits identification information for identifying said compressed level information of the entire region of the screen from said compressed level information of the changed region or from compressed differential information of the changed region as well as said compressed level information of the entire region of the screen.

7. A transmission system for video information characterized by having:
   a first terminal apparatus said first terminal apparatus comprising:
      an input part for inputting video information transmitted by a central processing unit;
      a level information generation part for generating level information of each pixel on a screen based on at least said video information;
      a memory part for storing the level information of each pixel in the entire region of the screen;
      a region extraction part for extracting a changed region which is a region on the screen including pixels related to said video information;
      an update region level information generation part for generating level information of each pixel in said changed region based on, at least, either the level information of each pixel generated by said level information generation part or the level information of each pixel stored in said memory part;
a compression part for compressing the information amount of level information of each pixel in said changed region;
a communication part for transmitting position information of said changed region and said compressed level information; and
a second terminal apparatus, comprising:
a communication part for receiving position information of a changed region and compressed level information of each pixel in said changed region;
an expansion part for expanding said compressed level information and outputting level information of each pixel in said changed region;
a memory part for storing level information of each pixel in the entire region of the screen and for storing the level information of each pixel outputted by said expansion part in accordance with the position information of said changed region; and
a display part for displaying a screen in accordance with the level information of each pixel stored in said memory part.

8. A transmission system for video information characterized by having:
a first terminal apparatus, comprising:
an input part for inputting video information transmitted by a central processing unit;
a level information generation part for generating level information of each pixel on a screen based on at least said video information;
a memory part for storing the level information of each pixel in the entire region of the screen;
a region extraction part for extracting a changed region which is a region on the screen including pixels related to said video information;
an update region level information generation part for generating level information of each pixel in said changed region based on, at least, either the level information of each pixel generated by said level information generation part or the level information of each pixel stored in said memory part;
a compression part for compressing the information amount of level information of each pixel in said changed region;
a communication part for transmitting position information of said changed region and said compressed level information, wherein
said update region level information generation part generates differential information of the level information of each pixel in said changed region extracted based on, at least, the level information of each pixel generated by said level information generation part and the level information of each pixel stored in said memory part and said compression part compresses the differential information; and
a second terminal apparatus comprising:
a communication part for receiving position information of a changed region and compressed level information of each pixel in said changed region;
an expansion part for expanding said compressed level information and outputting level information of each pixel in said changed region;
a memory part for storing level information of each pixel in the entire region of the screen and for storing the level information of each pixel outputted by said expansion part in accordance with the position information of said changed region;
a display part for displaying a screen in accordance with the level information of each pixel stored in said memory part;
a level information updating part for updating the level information of each pixel stored in said memory part; characterized in that
the communication part receives compressed differential information which is a compressed difference of the level information of each pixel in said changed region;
the expansion part expands said compressed differential information and generates differential information of the level information of each pixel in said changed region; and
the level information updating part updates the level information of each pixel stored in said memory part based on the position information of the changed region received by said communication part, the differential information of the level information of each pixel generated by said expansion part and the level information of each pixel stored in said memory part, wherein said update region level information generation part generates differential information of the level information of each pixel in said changed region extracted, based on, at least, the level information of each pixel generated by said level information generation part and the level information of each pixel stored in said memory part, and said compression part compresses the differential information.

9. The transmission system for video information according to claim 7, characterized in that said communication parts of said first terminal apparatus and said second terminal apparatus are wireless communication parts, respectively.

10. A transmission method for video information, characterized by the steps of:
inputting video information transmitted by a central processing unit;
generating level information of each pixel on a screen based on, at least, said video information;
storing said level information of each pixel in a memory part;
extracting a changed region which is a region of the screen including pixels related to said video information;
generating level information of each pixel in said changed region of the screen based on at least, either the level information of each pixel generated in said level information generation step or the level information of each pixel stored in said memory step;
compressing the information amount of the level information of each pixel in said changed region; and
transmitting position information of said changed region and said compressed level information.

11. The transmission method for video information according to claim 10, characterized in that:
the update region level information generation step generates differential information of level information of each pixel in said changed region extracted based on, the level information of each pixel generated in said level information generation step and the level information of each pixel stored in a memory and the compression step compresses the differential information.

12. The transmission method for video information according to claim 10, characterized in that said changed region is a rectangular region including pixels of m rows and n columns (m, n are positive integers of 1 or more, respectively).

13. The transmission method for video information according to claim 12, characterized in that said changed region is a set of pixels wherein the upper i bits of the row address (in the case that the row address is assumed to be data of h bits, i is a positive integer satisfying $1<i<(h-1)$) and the upper j bits of the column address (in the case that the column address is assumed to be data of k bits, j is a positive integer satisfying $1<j<(k-1)$) of each pixel on the screen are the same.

14. The transmission method for video information according to claim 10, characterized in that information are transmitted by means of a wireless communication in said transmission step.

15. The transmission method for video information according to claim 10, further characterized by:
reading out level information of each pixel in the entire region of the screen from said memory part with a frequency of at least once or more for a constant period of time;
compressing the information amount of the level information of each pixel in the entire region of the screen; and
transmitting identification information for identifying said compressed level information of the entire region of the screen from said compressed level information of the changed region or from compressed differential information of the changed region and said compressed level information of the entire region of the screen.

16. A transmission method for video information inputting video information transmitted by a central processing unit;
generating level information of each pixel on a screen based on, at least, said video information;
storing said level information of each pixel in a memory part;
extracting a changed region which is a region of the screen including pixels related to said video information;
generating level information of each pixel in said changed region of the screen based on, at least, either the level information of each pixel generated in said level information generation step or the level information of each pixel stored in said memory step;
compressing the information amount of the level information of each pixel in said changed region; and
transmitting position information of said changed region and said compressed level information
receiving position information of said changed region and compressed level information of each pixel in said changed region;
expanding said compressed level information and outputting level information of each pixel in said changed region;
storing the level information of each pixel outputted in said expansion step in a memory part in accordance with the position information of said changed region; and
displaying a screen in accordance with the level information of each pixel stored in said memory part.

17. A transmission method for video information inputting video information transmitted by a central processing unit;
generating level information of each pixel on a screen based on, at least, said video information;
storing said level information of each pixel in a memory part;
extracting a changed region which is a region of the screen including pixels related to said video information;
generating level information of each pixel in said changed region of the screen based on, at least, either the level information of each pixel generated in said level information generation step or the level information of each pixel stored in said memory step;
compressing the information amount of the level information of each pixel in said changed region; and
transmitting position information of said changed region and said compressed level information, wherein
the update region level information generation step generates differential information of level information of each pixel in said changed region extracted based on, the level information of each pixel generated in said level information generation step and the level information of each pixel stored in a memory and the compression step compresses the differential information, the method further including;
a communication step for receiving position information of a changed region and compressed level information of each pixel in said changed region
an expansion step for expanding said compressed level information and outputting level information of each pixel in said changed region;
a memory step for storing the level information of each pixel outputted in said expansion step in a memory part in accordance with the position information of said changed region;
a display step for displaying a screen in accordance with the level information of each pixel stored in said memory part;
a level information updating step for updating level information of each pixel stored in a memory part, characterized in that the a communication step receives compressed differential information which is a compressed difference of the level information of each pixel in said changed region, wherein
the expansion step expands said compressed differential information and generating differential information of the level information of each pixel in said changed region, and
the level information updating step updates level information of each pixel stored in a memory part based on the position information of the changed region received in said communication step, the differential information of the level information of each pixel generated in said expansion step and the level information of each pixel stored in said memory step wherein the update region level information generation step generates differential information of level information of each pixel in said changed region extracted, based on, the level information of each pixel generated in said level information generation step and the level information of each pixel stored in a memory, and the compression step compresses the differential information.

18. The transmission method for video information according to claim 16, characterized in that said transmission step and said reception step are implemented by means of a wireless communication.

19. A terminal apparatus for video information characterized by having:

a communication part for receiving position information of a changed region and compressed level information of each pixel in said changed region which are transmitted by a transmission apparatus for video information according to claim 1;

an expansion part for expanding said compressed level information and outputting level information of each pixel in said changed region;

a memory part for storing level information of each pixel in the entire region of the screen and for storing the level information of each pixel outputted by said expansion part in accordance with the position information of said changed region ; and a display part for displaying a screen in accordance with the level information of each pixel stored in said memory part.

20. The terminal apparatus for video information according to claim 19 further having:

a level information updating part for updating the level information of each pixel stored in said memory part; characterized in that the communication part receives compressed differential information which is a compressed difference of the level information of each pixel in said changed region and transmitted by a transmission apparatus for video information;

the expansion part expands said compressed differential information and generates differential information of the level information of each pixel in said changed region; and the level information updating part updates the level information of each pixel stored in said memory part based on the position information of the changed region received by said communication part, the differential information of the level information of each pixel generated by said expansion part and the level information of each pixel stored in said memory part, wherein said update region level information generation part generates differential information of the level information of each pixel in said changed region extracted, based on, at least, the level information of each pixel generated by said level information generation part and the level information of each pixel stored in said memory part, and said compression part compresses the differential information.

21. The terminal apparatus for video information according to claim 19, characterized in that said communication part is a wireless communication part.

22. A transmission method for video information characterized by having:

a communication step for receiving position information of a changed region and compressed level information of each pixel in said changed region which are transmitted by a transmission method for video information according to claim 10;

an expansion step for expanding said compressed level information and outputting level information of each pixel in said changed region;

a memory step for storing the level information of each pixel outputted in said expansion step in a memory part in accordance with the position information of said changed region; and a display step for displaying a screen in accordance with the level information of each pixel stored in said memory part.

23. The transmission method for video information according to claim 22 further having:

a level information updating step for updating level information of each pixel stored in a memory part, characterized in that the communication step receives compressed differential information which is a compressed difference of the level information of each pixel in said changed region and transmitted by a transmission method for video information, the expansion step expands said compressed differential information and generating differential information of the level information of each pixel in said changed region, and the level information updating step updates level information of each pixel stored in a memory part based on the position information of the changed region received in said communication step, the differential information of the level information of each pixel generated in said expansion step and the level information of each pixel stored in said memory step wherein the update region level information generation step generates differential information of level information of each pixel in said changed region extracted, based on, the level information of each pixel generated in said level information generation step and the level information of each pixel stored in a memory, and the compression step compresses the differential information.

24. The transmission method for video information according to claim 22, characterized in that said communication step is a wireless communication step.

* * * * *

UNITED STATES PATENT AND TRADEMARK OFFICE
CERTIFICATE OF CORRECTION

PATENT NO.      : 7,082,612 B2
APPLICATION NO. : 09/844565
DATED           : July 25, 2006
INVENTOR(S)     : Kazuo Okamoto et al.

It is certified that error appears in the above-identified patent and that said Letters Patent is hereby corrected as shown below:

Column 24:

Line 19, "columns (in," should read -- columns (m, --;

Signed and Sealed this

Twentieth Day of March, 2007

JON W. DUDAS
*Director of the United States Patent and Trademark Office*